United States Patent
Melis et al.

(10) Patent No.: US 8,588,710 B2
(45) Date of Patent: Nov. 19, 2013

(54) METHOD AND SYSTEM FOR MULTIPLE ANTENNA COMMUNICATIONS, RELATED APPARATUS AND CORRESPONDING COMPUTER PROGRAM PRODUCT

(75) Inventors: Bruno Melis, Turin (IT); Alfredo Ruscitto, Turin (IT); Paolo Semenzato, Rome (IT); Renata Mele, Milan (IT); Giuseppe Grassano, Milan (IT)

(73) Assignees: Telecom Italia S.p.A., Milan (IT); Pirelli & C. S.p.A., Milan (IT)

( * ) Notice: Subject to any disclaimer, the term of this patent is extended or adjusted under 35 U.S.C. 154(b) by 748 days.

(21) Appl. No.: 12/083,103

(22) PCT Filed: Oct. 5, 2005

(86) PCT No.: PCT/EP2005/010799
§ 371 (c)(1),
(2), (4) Date: Jun. 16, 2010

(87) PCT Pub. No.: WO2007/038969
PCT Pub. Date: Apr. 12, 2007

(65) Prior Publication Data
US 2010/0267347 A1    Oct. 21, 2010

(51) Int. Cl.
*H04B 7/02* (2006.01)

(52) U.S. Cl.
USPC ............. 455/101; 455/73; 370/517; 370/519

(58) Field of Classification Search
USPC ................. 455/73, 272, 101; 370/517, 519
See application file for complete search history.

(56) References Cited

U.S. PATENT DOCUMENTS

| | | | | |
|---|---|---|---|---|
| 4,278,978 | A | | 7/1981 | Frosch et al. |
| 4,677,393 | A | * | 6/1987 | Sharma ........................ 330/286 |
| 5,305,353 | A | * | 4/1994 | Weerackody ................. 375/347 |
| 5,561,673 | A | * | 10/1996 | Takai et al. ................... 714/708 |
| 5,574,989 | A | | 11/1996 | Watson et al. |
| 5,748,673 | A | * | 5/1998 | Futagi et al. .................. 375/232 |
| 5,930,293 | A | | 7/1999 | Light et al. |

(Continued)

FOREIGN PATENT DOCUMENTS

| EP | 1 164 718 A2 | 12/2001 |
|---|---|---|
| GB | 2 259 430 A | 3/1993 |

(Continued)

OTHER PUBLICATIONS

Wittneben, "A New Bandwith Efficient Transmit Antenna Modulation Diversity Scheme for Linear Digital Modulation", ASCOM Tech Ltd., ICC Conference, Geneva, pp. 1630-1637, (May 1993).

(Continued)

*Primary Examiner* — Gennadiy Tsvey
(74) *Attorney, Agent, or Firm* — Finnegan, Henderson, Farabow, Garrett & Dunner, L.L.P.

(57) ABSTRACT

A system for diversity processing two signals transmitted and/or received via two diversity antennas includes at least four respective propagation paths coupling the signals to the two diversity antennas. Diversity processing is primarily in the form of decorrelation achieved by means of time variable delay elements that apply time variable delays to the signals propagating over at least two of the propagation paths in the system. The related processing may take place either at RF or IF, or at baseband, whereby the time variable delays are applied by subjecting the baseband signals to multiplication by a complex signal.

23 Claims, 22 Drawing Sheets

(56) References Cited

U.S. PATENT DOCUMENTS

| | | | |
|---|---|---|---|
| 6,125,109 A * | 9/2000 | Fuerter | 370/315 |
| 6,275,482 B1 * | 8/2001 | Jevremovic et al. | 370/334 |
| 6,301,316 B1 * | 10/2001 | Uchida et al. | 375/347 |
| 6,441,783 B1 * | 8/2002 | Dean | 342/372 |
| 6,510,175 B1 * | 1/2003 | Hunsinger et al. | 375/216 |
| 6,785,558 B1 * | 8/2004 | Stratford et al. | 455/561 |
| 6,868,254 B2 | 3/2005 | Weissman | |
| 7,277,679 B1 * | 10/2007 | Barratt et al. | 455/101 |
| 7,567,624 B1 * | 7/2009 | Schmidl et al. | 375/299 |
| 7,822,140 B2 * | 10/2010 | Catreux et al. | 375/267 |
| 2001/0050963 A1 | 12/2001 | Yoneyama | |
| 2003/0016096 A1 * | 1/2003 | Higgins et al. | 333/124 |
| 2003/0076891 A1 * | 4/2003 | Won | 375/267 |
| 2003/0130003 A1 * | 7/2003 | Won | 455/522 |
| 2003/0153322 A1 * | 8/2003 | Burke et al. | 455/450 |
| 2004/0041948 A1 * | 3/2004 | Collins et al. | 348/555 |
| 2004/0266338 A1 * | 12/2004 | Rowitch | 455/7 |
| 2005/0157683 A1 | 7/2005 | Ylitalo et al. | |
| 2005/0157684 A1 | 7/2005 | Ylitalo et al. | |
| 2007/0248038 A1 * | 10/2007 | Yamasaki et al. | 370/328 |

FOREIGN PATENT DOCUMENTS

| | | |
|---|---|---|
| WO | WO 02/19565 A2 | 3/2002 |
| WO | WO 03/055097 A2 | 7/2003 |
| WO | WO 2006/037364 A1 | 4/2006 |

OTHER PUBLICATIONS

Papoulis, "Probability, Random Variables, and Stochastic Processes", Mc-Graw-Hill Kogakusha, Ltd., Chapter 7, pp. 210-211, (1965).

Kim, et al., "Time-Delay Phase Shifter Controlled by Piezoelectric Transducer on Coplaner Waveguide", IEEE Mircowave and Wireless Components Letters, vol. 13, No. 1, pp. 19-20, (Jan. 2003).

* cited by examiner

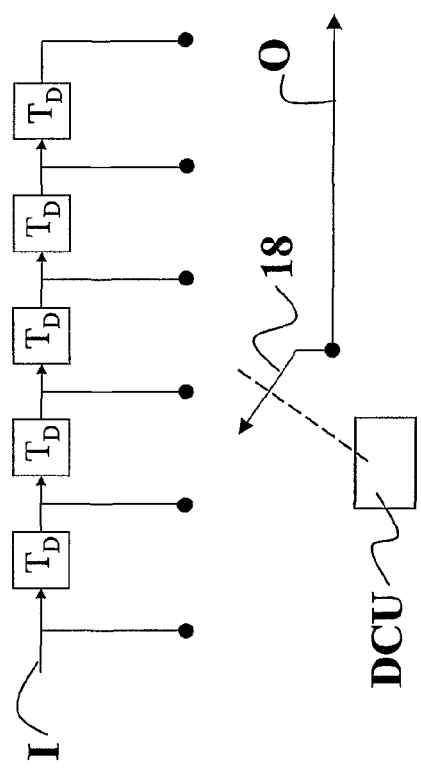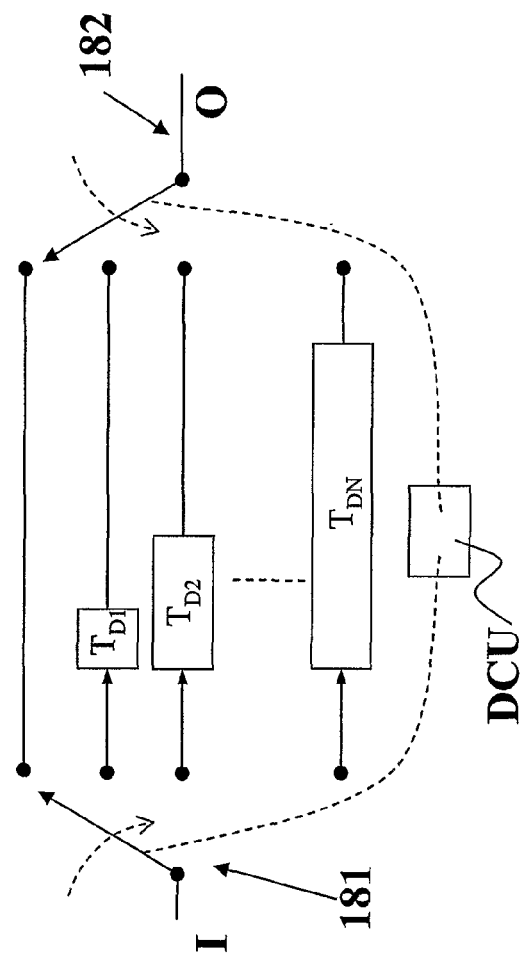
Fig. 4a
Fig. 4b

METHOD AND SYSTEM FOR MULTIPLE ANTENNA COMMUNICATIONS, RELATED APPARATUS AND CORRESPONDING COMPUTER PROGRAM PRODUCT

CROSS REFERENCE TO RELATED APPLICATION

This application is a national phase application based on PCT/EP2005/010799, filed Oct. 5, 2005, the content of which is incorporated herein by reference.

FIELD OF THE INVENTION

The present invention relates to communication systems and was developed with specific attention paid to its possible application in radio transmitters and receivers for mobile communication networks equipped with multiple antennas.

DESCRIPTION OF THE RELATED ART

Data services are driving the demand for increased data rate and thus increased system capacity. Many of these data services are likely to be used in low-mobility environments under single-path condition. Poor performance due to prolonged deep fading of the channel is one of the problems associated with this scenario. In wireless systems, channel coding is widely used in conjunction with interleaving to exploit time diversity and thus to improve radio link performance. However, in very slowly fading channels, which is a typical situation for low mobility users, interleaving required to spread long deeply faded blocks into decodable sequences is very long. The interleaving depth available in practice, on the other hand, is often fairly limited because of strict requirements for the allowable service delay and usage of memory.

Antenna diversity is a viable technique for overcoming the negative effects of prolonged multi-path fading in wireless systems. In diversity transmission, and similarly in diversity reception, two or more physically separated antennas (space diversity) or one or more cross-polarized antenna (polarization diversity) are respectively used to transmit or receive a given signal. By placing the antennas at a sufficient distance or by using +/−45 degrees slant cross-polarized antenna it is possible to minimize the amplitude correlation of the signals transmitted or received by the different antennas. In practice, the physical separation between the antennas is limited due to size or environmental constraints and thus the signals may still exhibit a significant degree of amplitude correlation. A significant degree of signal correlation can also be present in the signals transmitted or received through cross polarized antennas, in particular when the vertical-to-horizontal polarization power ratio, also referred to as cross-polar discrimination (XPD), takes high values.

As a consequence, a number of diversity techniques has been developed in order to improve the radio link performance by reducing the temporal autocorrelation of the received signals in low mobility scenarios while also minimizing the cross-correlation between the signals transmitted or received by the different antennas. These diversity techniques are applicable in wireless systems that have already been standardized, with minimal modifications on the deployed equipments and networks. The improvement of the radio link performance obtained with such diversity techniques leads to an increase of the system capacity or in an improvement of the QoS (Quality of Service) perceived by the users.

As schematically shown in FIG. 1, in the case of transmit diversity techniques operating at RF, the signals to be transmitted may be in the form of data from Layer 2 subject to baseband processing in a block 10 to be then fed via digital-to-analog converters 12 to respective IF/RF transmitters 14. The signals from the transmitters 14 are then fed to a RF network, denoted as transmission (TX) diversity processor 16. The TX diversity processor 16 feeds with its output signals the antenna transmission subsystem 1, 2.

Similarly, when the diversity technique is applied at the receiving side, the signals received by the various antennas 1, 2 are first processed by a receiver (RX) diversity processor 26 and then provided for the subsequent demodulation to a conventional receiver. As shown in FIG. 2, this receiver may include RF/IF receivers 24 having cascaded thereto analog-to-digital converters 22 and a baseband processing block 20 that outputs the received Layer 2 data stream. The TX and RX diversity processors 16, 26 are comprised of different RF elements such as signal splitters, combiners, delay lines, amplifiers, an so on. By combining these elementary blocks several structures of the diversity processor can be conceived.

While arrangements including two antennas will be referred to throughout this description for the sake of simplicity, those of skill in the art will appreciate that diversity arrangements able to operate with a number of antennas in excess of two can be easily devised starting from the information here provided in connection with two-antenna arrangements.

Many diversity techniques operating at RF have been considered in the literature. A first known method, denoted as fixed Delay Diversity (fixed DD), is used to increase the frequency diversity of the communication channel. The fixed DD technique is a simple transmit delay diversity technique that involves transmitting from a pair of antennas a signal and a delayed version of the same. The delay introduced in the signal transmitted from the second antenna is fixed and is typically chosen to be greater than the channel delay spread (i.e. in the order of microseconds). If the transmit antennas are widely spaced, the transmitted signals experience uncorrelated fading resulting in increased diversity and higher transmission reliability. The fixed DD technique can be also applied as a receiver diversity technique. In that case the receiver is equipped with two antennas. The signal received from one of the antennas is subject to a fixed delay, still greater than the channel delay spread, and then is recombined at RF level with the signal received from the second antenna. The combined signal is then provided to a conventional receiver for the subsequent demodulation.

The fixed DD technique was first proposed for the application in flat fading channels in an article of A. Wittneben "A New Bandwidth Efficient Transmit Antenna Modulation Diversity Scheme for Linear Digital Modulation", ICC Conference—pages 1630-1634, Geneva, May 1993. The application of fixed DD as a receiver diversity technique is described in U.S. Pat. No. 5,930,293, in case of a wireless repeater (applicant remarks that the same technique is applicable without modifications in a base station receiver). Specifically, U.S. Pat. No. 5,930,293 describes the application of the fixed DD technique for achieving antenna receive diversity in a wireless repeater. The repeater is equipped with two receiving antennas for receiving a signal from a wireless terminal. The signal received from one of the antennas is subject to a fixed delay and is recombined at RF with the other received signal. The combined signal is subsequently transmitted to the base station by means of a third antenna. The fixed delay is chosen at least equal to two chip periods in order to enable the Rake receivers in the base station to resolve and combine the two signals.

A similar application of fixed DD as a receive diversity technique is also disclosed in the U.S. Pat. No. 6,868,254 in case of a repeater adapted to receive differently polarized signals. Specifically, U.S. Pat. No. 6,868,254 describes a repeater structure equipped with two receive antennas that receive signals from a plurality of wireless terminals. The two receiving antennas are implemented so that the main and diversity signals differ by one or more characteristics. Preferably the two antennas are spatially separated by four wavelengths so that the received signals differ in amplitude when measured simultaneously. Alternatively the two antennas may receive different polarization or additionally a fixed time delay is introduced in one of the two paths.

A basic problem related to the fixed DD technique is the cost and size of the delay line used to introduce such delay on an analog RF signal. The delay line can be implemented for example with a RF cable although this solution has several drawbacks such as cost, size and transmission losses of the cable.

Another known diversity method disclosed in literature is the phase sweeping transmit diversity (PSTD) technique. The application of PSTD as a transmission diversity technique is obtained by transmitting the base station signal from a pair of antennas. The two antennas radiate the same signal but the phase of one antenna is "swept" relative to the other. The phase sweep is obtained by means of an RF phase shifter that introduces a time variant phase shift $\varphi(t)$, with a given variation law (e.g. linear, sinusoidal, etc.), on the signal transmitted by the second antenna. The introduction of a time variant phase rotation is equivalent to shifting the carrier frequency of the second signal. In fact by denoting with $\varphi(t)$ the phase sweep function, the instantaneous carrier frequency $f_s(t)$ of the signal transmitted by the second antenna is equal to $$f_s(t) = f_0 + \frac{1}{2\pi}\frac{d\varphi(t)}{dt} \quad (1)$$

where $f_0$ is the carrier frequency without PSTD. We also notice that, at a given time instant $t_k$, all the frequency components within the signal bandwidth B are phase rotated of the same quantity $\varphi(t_k)$. The combination of two signals that differ slightly in frequency creates an amplitude-modulated signal that fades periodically and thus induces more rapid fades at the receiver. This improves the channel coding gain in a very slow multipath fading environment.

An application of PSTD is disclosed e.g. in WO-A-02/19565. This document describes the application of the PSTD technique as a transmission diversity technique, suitable for systems equipped with multiple transmitting antennas. The document presents also some methods and the related apparatus for the combination of the fixed. DD and PSTD techniques. Specifically, WO-A-02/19565 presents some methods and the related apparatus for the combination of the fixed DD and PSTD techniques. In the method and apparatus, an input symbol stream is offset in time by M symbols periods to generate an offset symbol stream. The original input symbol stream is then transmitted on a first set of N antennas and the offset input symbol stream is transmitted on a second set of N antennas. On each set of N antennas the PSTD diversity technique is applied in order to further increase the diversity level. The phase shifting of PSTD may be either a continuous phase sweep or discrete phase hopping in every burst period.

Another example of application of PSTD, applied as transmission diversity technique, is provided in WO-A-03/055097. Specifically, this prior art document describes a method for providing Phase Shift Transmit Diversity (PSTD) in a wireless communication system. The base station phase shift modulates a first signal with a reference signal to produce a first phase-shift modulated signal. Further, the base station phase shift modulates a second signal with a different reference signal to produce a second phase shift modulated signal. The second phase shift is distinct from the first phase shift such that the second phase shift modulated signal is diverse relative to the first phase shift modulated signal. Accordingly, the base station transmits the first phase-shift modulated signal via a first antenna and the second phase shift modulated signal via a second antenna to a plurality of mobile, stations.

Still another approach for transmission diversity is disclosed in PCT application PCT/EP2004/011204, wherein a variable time delay is used in the place of a variable phase shift. Specifically, the prior art document in question discloses, a system for transmitting a signal via diversity antennas. The system is adapted for use in e.g. radio base stations, repeaters and terminals of a mobile communication network, and includes a delay element for generating a delayed replica of the signal subject to a given delay. The signal and the delayed replica are transmitted via the diversity antennas, and a control unit acts on the delay element to vary the delay. The signal and the delayed replica, transmitted via the diversity antennas, give rise to alternate constructive and destructive combinations therebetween.

OBJECT AND SUMMARY OF THE INVENTION

Despite the significant efforts documented by the prior art discussed in the foregoing, the need is still felt for further improved diversity transmission/reception arrangements that may dispense with the shortcomings intrinsically related to the arrangements analysed previously, especially as regards the possibility of further reducing the degree of correlation of the resulting signals in the direction of rendering them notionally uncorrelated (which represents the optimum operating condition for diversity techniques). Additional needs/problems are related to the implementation of low-cost, compact variable time delay/phase shifter units. A specifically felt need is related to the possibility of implementing such units that can act as "reciprocal" units adapted to be used both in the transmission and in the reception of diversity signals.

The object of the present invention is thus to provide a satisfactory response to the need outlined in the foregoing.

According to the present invention, that object is achieved by means of a method having the features set forth in the claims that follow. The invention also relates to a corresponding system, a related apparatus as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion. The claims are an integral part of the disclosure of the invention provided herein.

A preferred embodiment of the invention is thus a method of diversity processing at least two signals propagated (i.e.

transmitted and/or received) via at least two diversity antennas, the method including the steps of:

coupling each said at least two signals to each said at least two diversity antennas via respective signal propagation paths, thus giving rise to at least four propagation paths, and subjecting the signals propagating over at least two of said propagating paths to time variable delays.

As described herein, diversity processing shall primarily involve "decorrelating", i.e. reducing the degree of correlation between the signals considered, in the directions of rendering them notionally uncorrelated. As is well known (see e.g. A. Papoulis: "Probability, Random Variables, and Stochastic Processes", Mc Graw-Hill, Inc.© 1965, p. 211) two random signals/variables x and y are called uncorrelated if $E\{xy\}=E\{x\}E\{y\}$.

In brief, the arrangement described herein is exemplary of a diversity method that can be applied both at the transmitter and at the receiver side in a wireless communication system in order to improve the link level performance: in that respect, reference to at least two signals that are "propagated", is intended to highlight the fact that the invention applies both to signals that are transmitted and to signals that are received. This approach, which can be designated a Dynamic Delay Diversity (DDD) approach, involves introducing a time variable delay on the signals transmitted and/or received by the different antennas. The delay required to make effective the technique is significantly smaller when compared to other diversity techniques such as the fixed DD. In general, the required delay varies between zero and the period $T_0$ of the RF signal (i.e. the carrier signal). For example, the application of the DDD technique described herein in a base station transceiver compliant with the UMTS (Universal Mobile Telecommunications System) standard requires the introduction of a delay that varies between zero and the carrier period $T_0=1/(1920 \text{ MHz})=0.52$ nanoseconds. Typically, the time variable delays considered herein lie in the range between tenths of nanoseconds (ns) and units of nanoseconds (ns).

The delay functions, according to which the delay varies as a function of time, are not restricted to particular functions and can be continuous functions (e.g. linear, sinusoidal) or discrete step functions.

A significant advantage of the DDD technique described herein in comparison with other diversity techniques is the low value of delay to be introduced in order to make the technique effective. The delay required by the technique described herein is in the order of few nanoseconds, compared to a delay of some microseconds as required by the fixed DD. As a consequence the implementation problems, related to size, cost and transmission losses of the delay line, are significantly reduced in case of the DDD technique described herein with respect to other diversity techniques.

Another advantage of the DDD technique described herein is represented by its better linearity when compared with other techniques such as the PSTD. By using a time variant delay line, the phase shift $\phi(f)$ introduced on the signal is, by definition, a linear function of the frequency. As a consequence the DDD technique described herein will not cause phase distortions, even when dealing with wideband signals. On the other hand, as disclosed in several prior-art references, the realization of a phase shifter that introduces a constant phase shift over a wide frequency band makes the RF design complicated and costly and thus it is suitable only for narrow-band signals.

The invention thus refers to a diversity technique that can be employed both in transmission and in reception in conjunction with any wireless communication apparatus (e.g. base stations and/or mobile terminals in a mobile communication network) equipped with two or more antennas. The invention is applicable in any wireless communication system, including those that have already been standardized. Preferably, the invention is intended to be implemented at the RF level: however, the basic principle of the diversity technique underlying the invention is also applicable at a different stage in the radio transmission and reception chain such as at the Intermediate Frequency (IF) stage or at the Base Band (BB) stage.

BRIEF DESCRIPTION OF THE ANNEXED DRAWINGS

These and other characteristics of this invention will become evident from the following description of a preferred embodiment of the same, given by way of a non-limiting example, and from the attached drawings, wherein:

FIGS. 1 and 2 have been already described in the foregoing;

FIGS. 4a and 4b are exemplary of two possible embodiments of one of the components included in the arrangement of FIG. 3;

Figure 7:
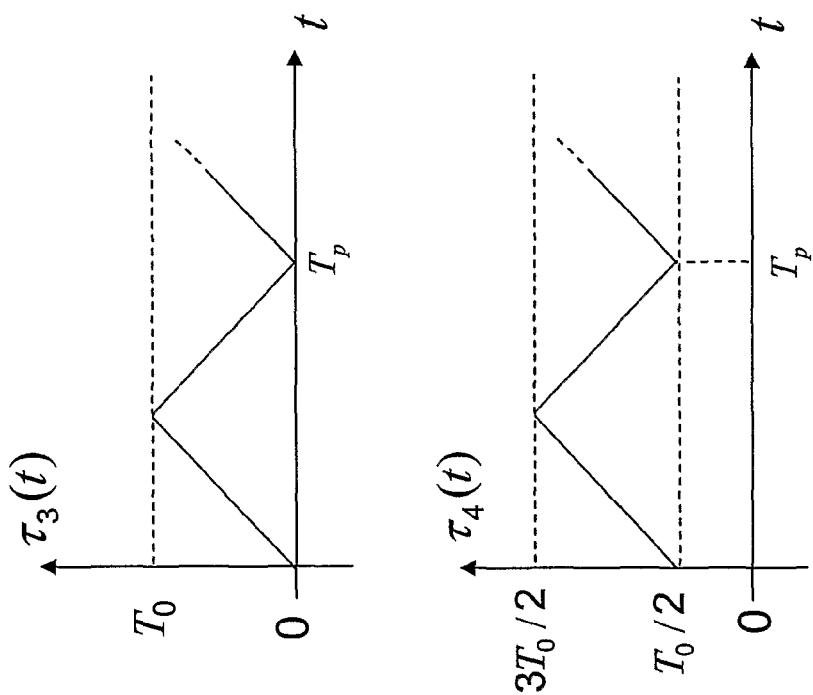
Figure 8:
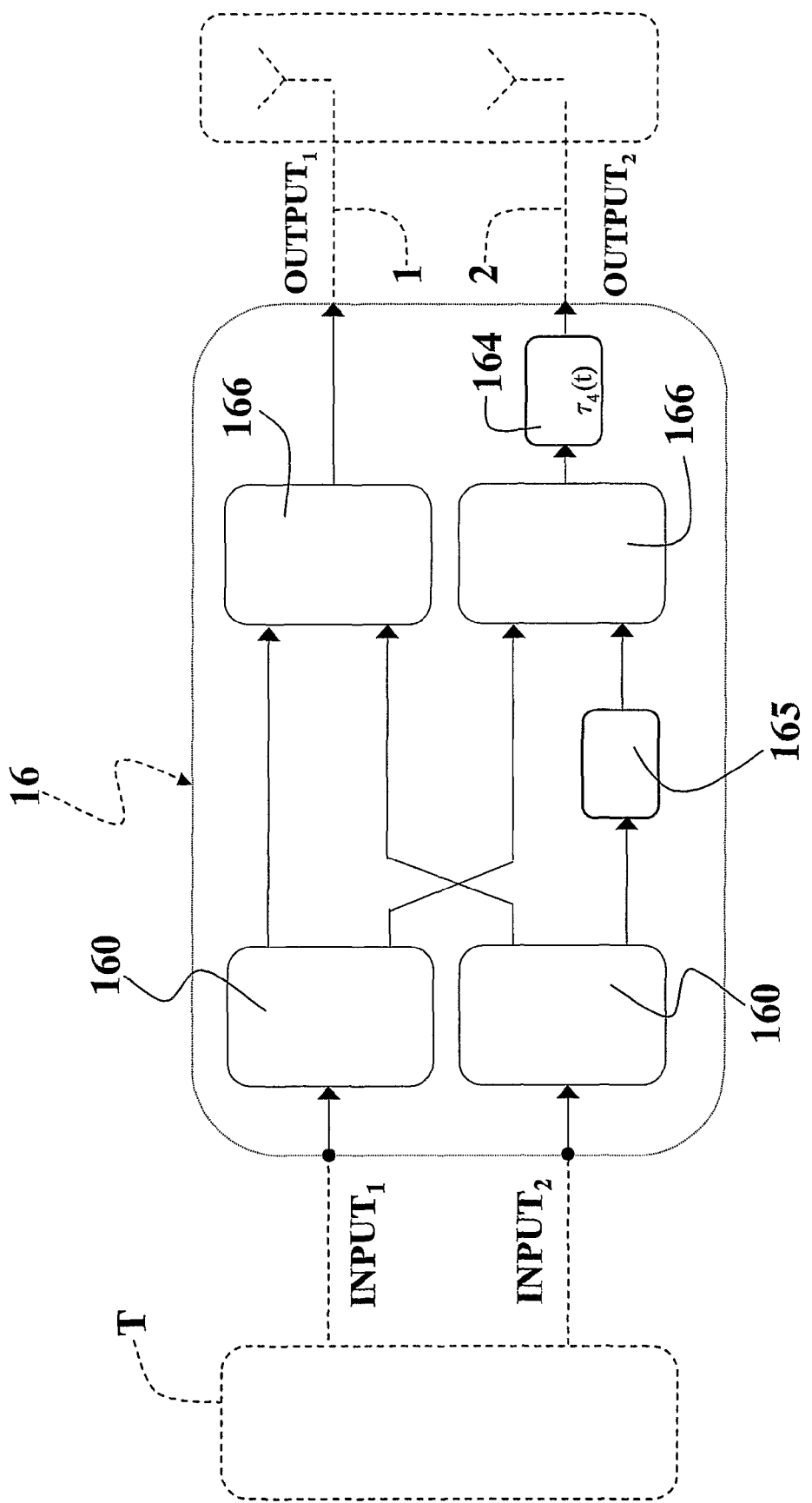
Figure 13:
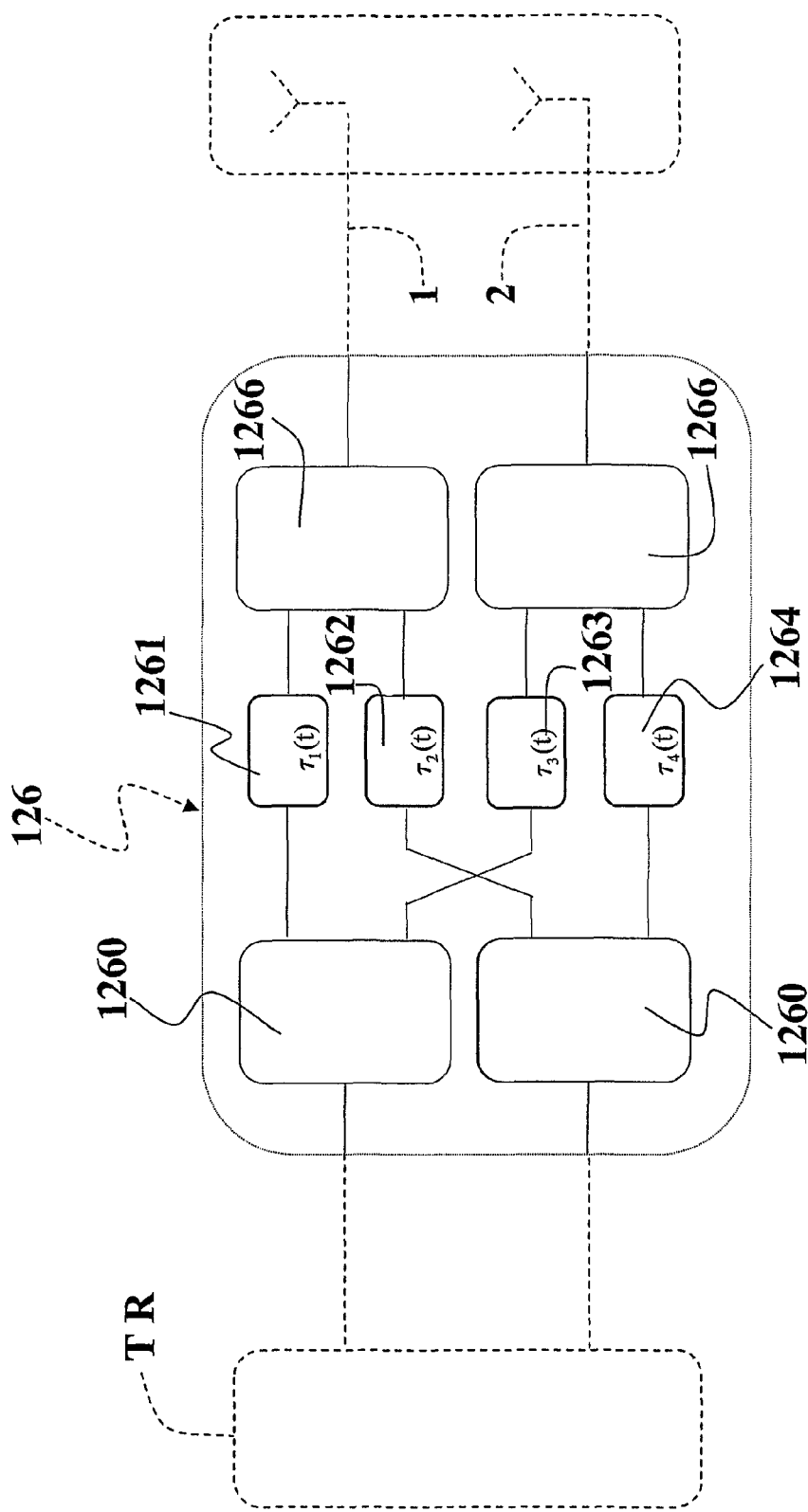
Figure 14:
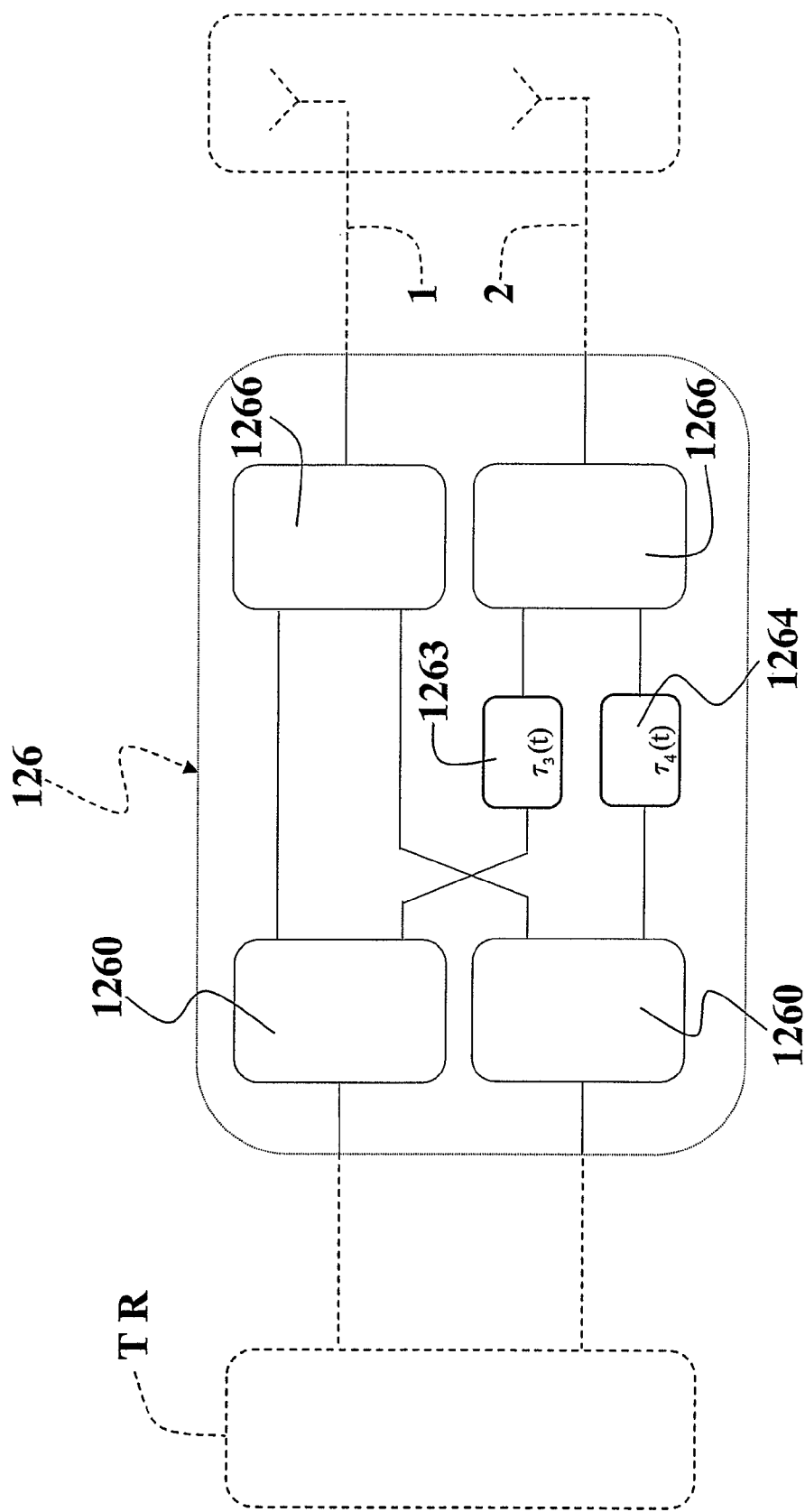
Figure 15:
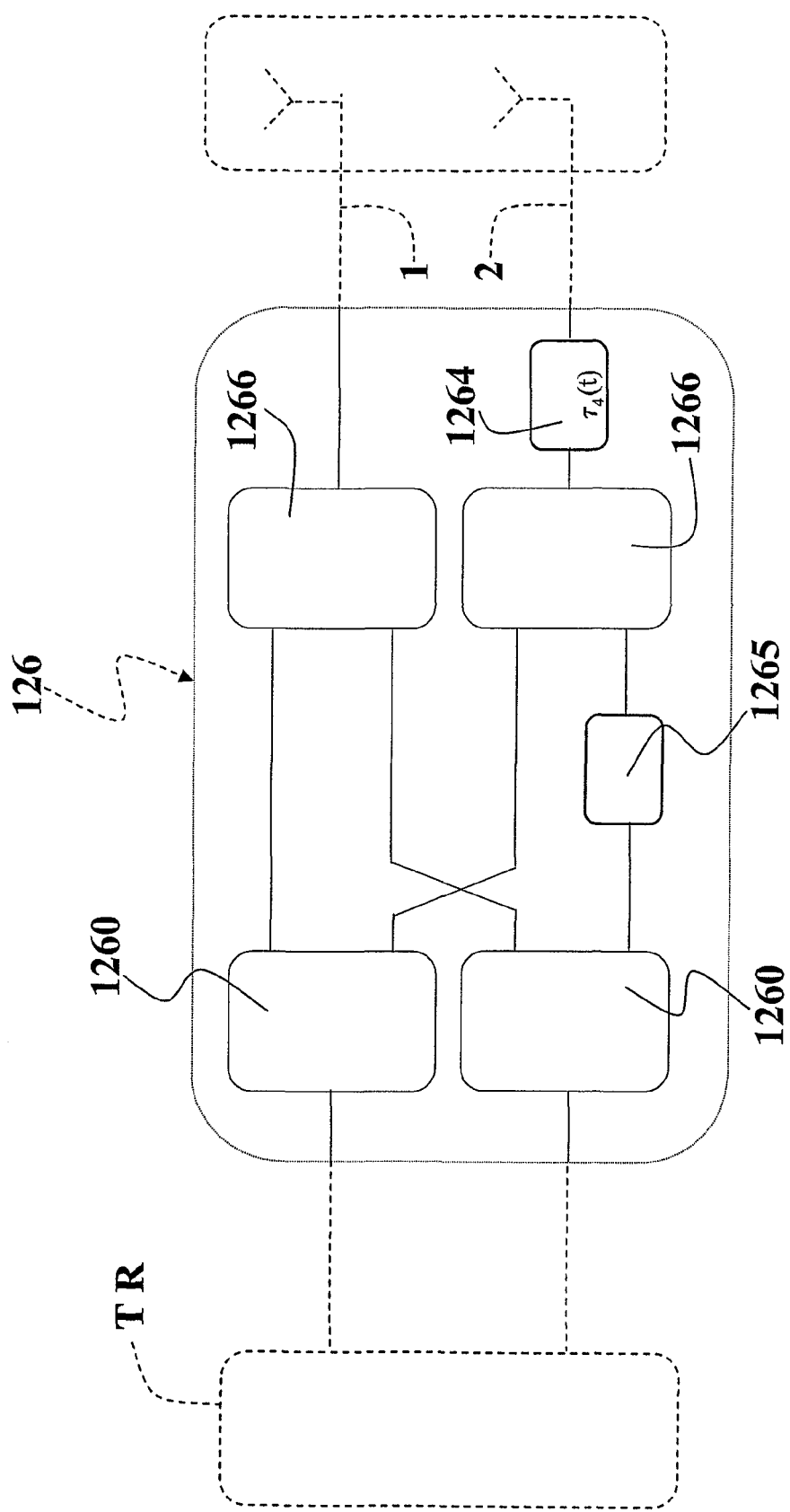
Figure 16:
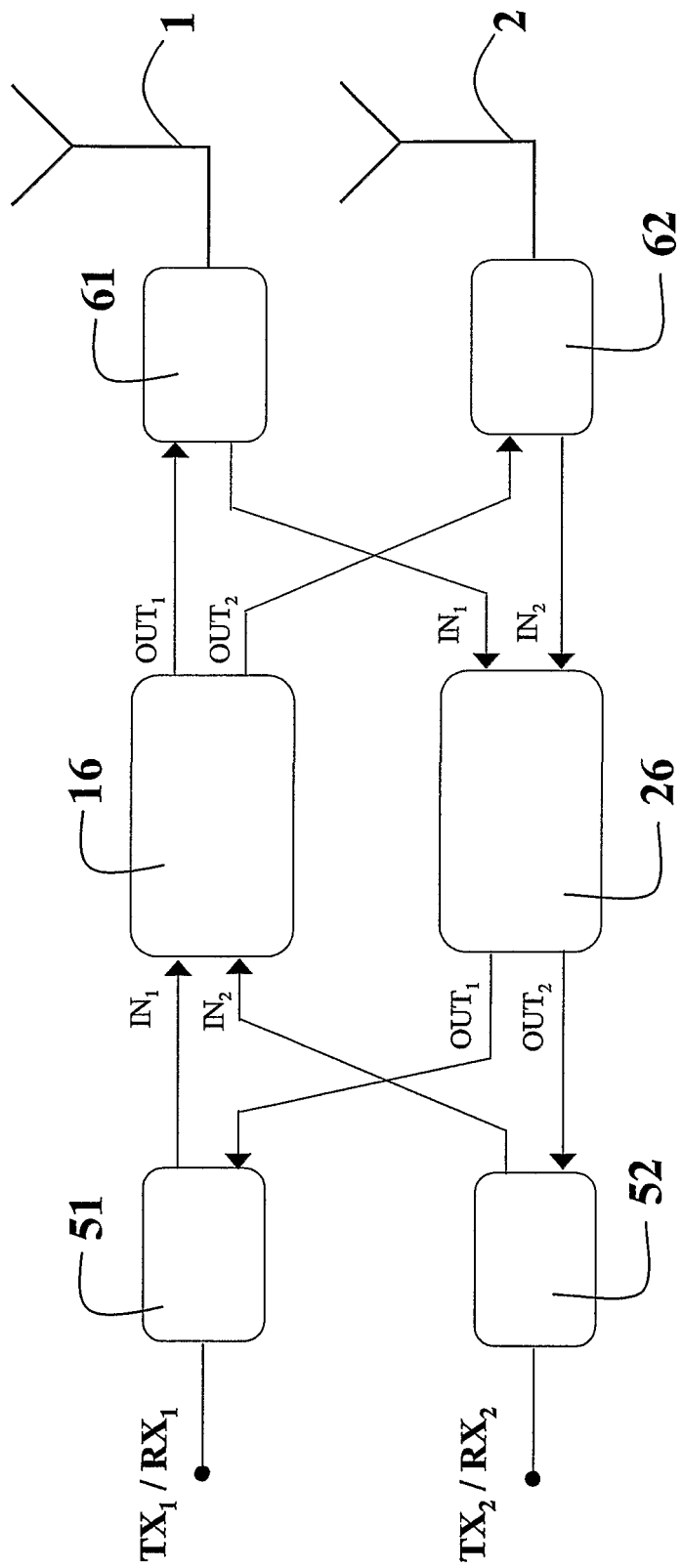
Figure 17:
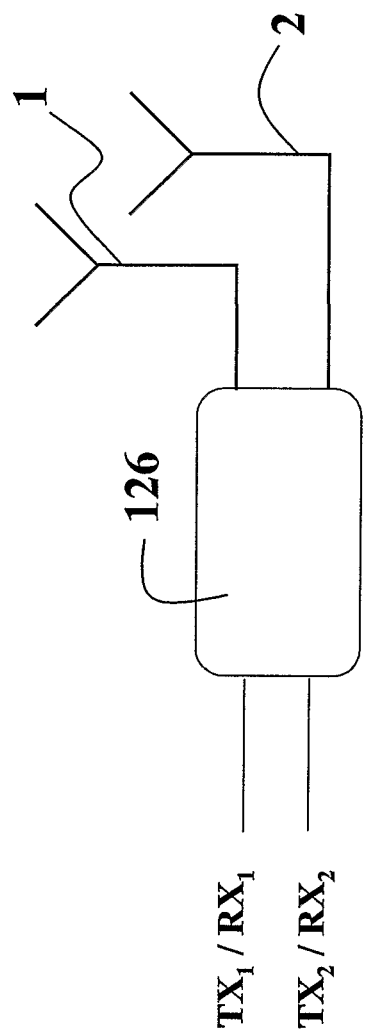
Figure 18:
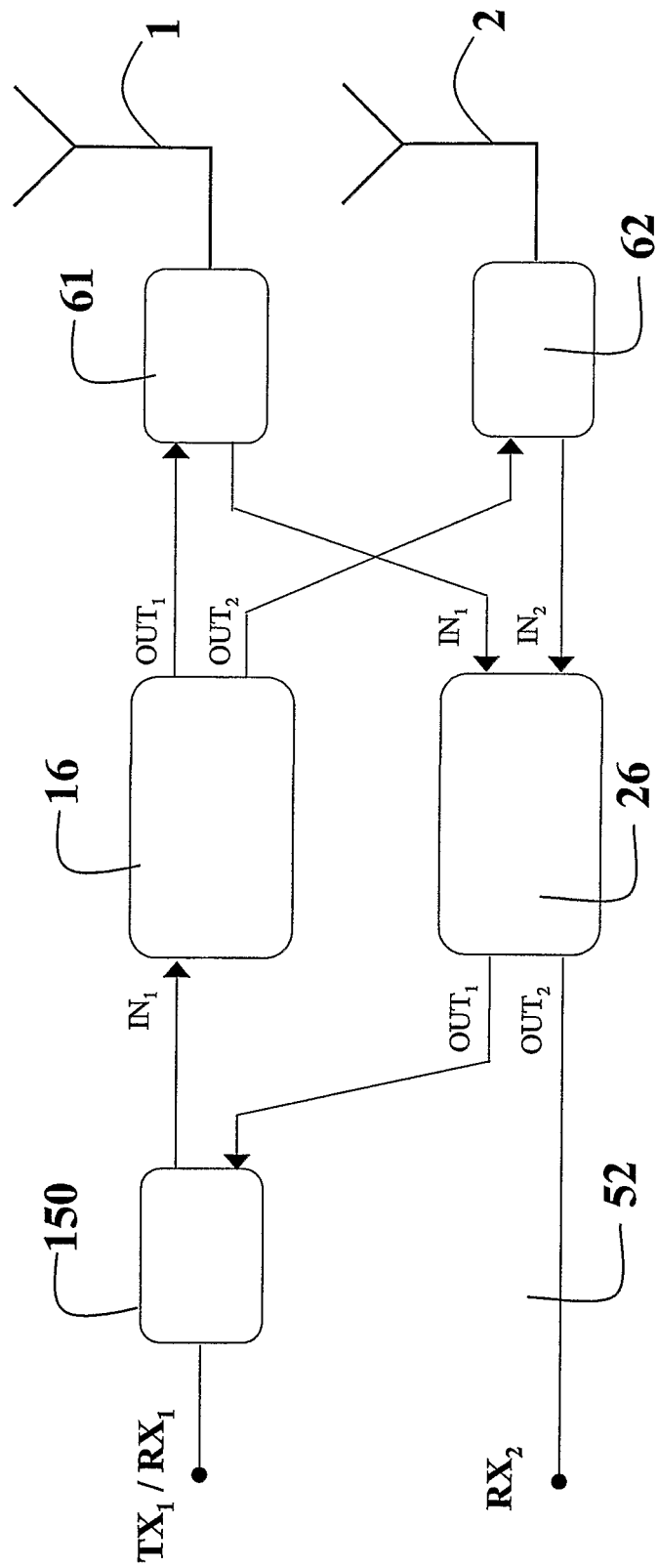
Figure 19:
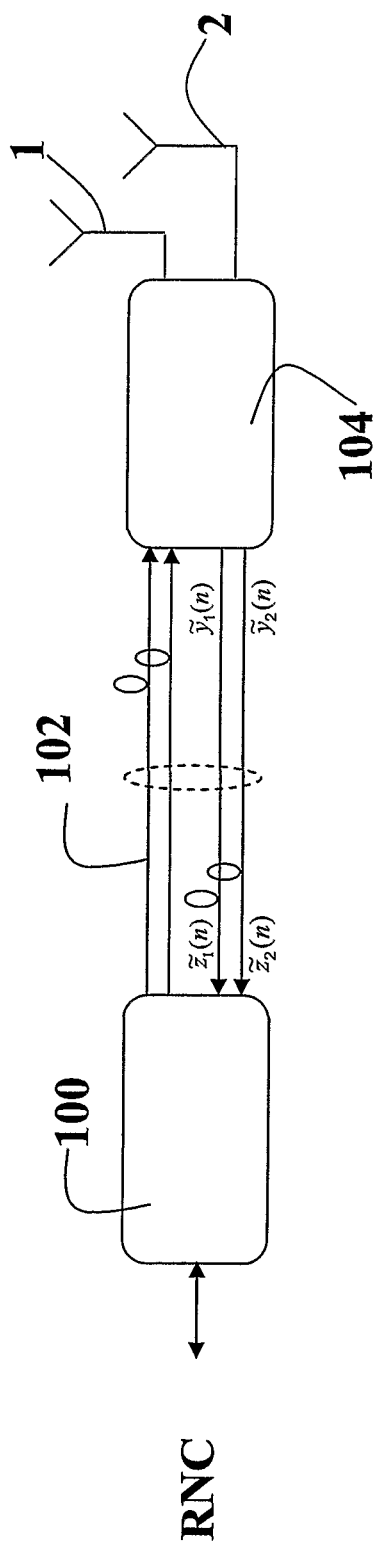

FIG. 7 includes two diagrams representative of certain parameters involved in operation of the arrangement described herein;

FIG. 8 is a schematic block diagram of another possible variant of a diversity arrangement as described herein when applied on the transmitter side;

FIGS. 9 to 12 are block diagrams essentially corresponding to the block diagrams of FIGS. 3, 5, 6, and 8 and referring to a diversity arrangement as described herein when applied on the receiver bide;

FIGS. 13 to 15 are block diagrams referring to "reciprocal" diversity arrangements adapted to operate both as transmitters and as receivers;

FIGS. 16 to 18 are block diagrams that illustrate different system architectures involving diversity arrangements as described herein both in transmission and reception; and FIGS. 19 to 22 are exemplary of a number of practical embodiments of the arrangement described herein including possible non-RF implementations.

DETAILED DESCRIPTION OF EXEMPLARY EMBODIMENTS OF THE INVENTION

In the following, the application of the Dynamic Delay Diversity (DDD) technique described herein will be first discussed in connection with its use as a transmit technique and subsequently in connection with its use as a receive diversity technique.

Figure 1:
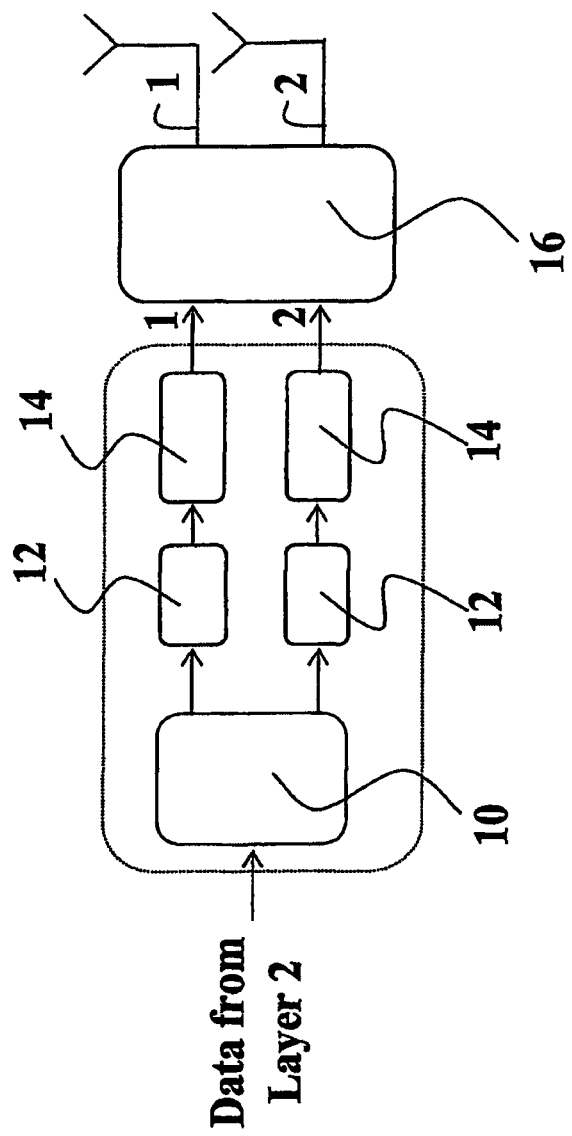
Figure 2:
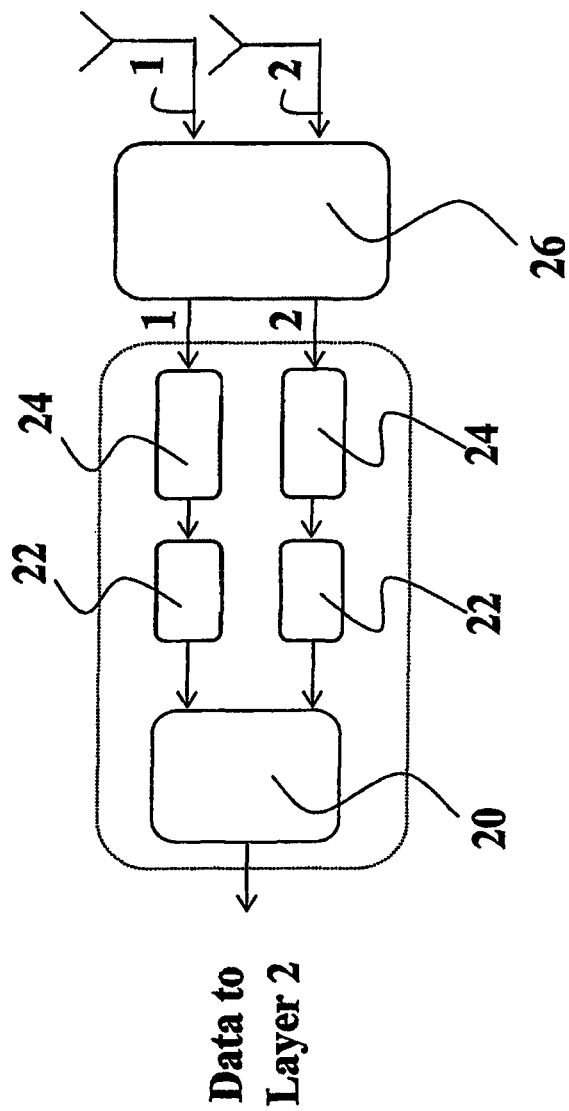

In general terms, the DDD technique as first described herein is realized by means of a diversity processor that is connected at the output of a conventional transmitter T (elements 10, 12, and 14 as shown in FIG. 1) or at the input of a conventional receiver R (elements 20, 22, and 24 as shown in FIG. 2. The various implementations of the diversity processors, realized according to the principle of the DDD, are denoted in the subsequent description as DDD TX processors 16 (transmit diversity) or DDD RX processors 26 (receive diversity).

For the sake of simplicity, the system description provided herein will not consider specific circuit details, such as e.g. the utilization of Low Noise Amplifiers (LNAs) or High Power Amplifiers (HPAs), which can be connected at the input and/or at the output of the DDD processors, in order to improve the overall receiver noise figure or to increase the transmitted power respectively.

Figure 3:
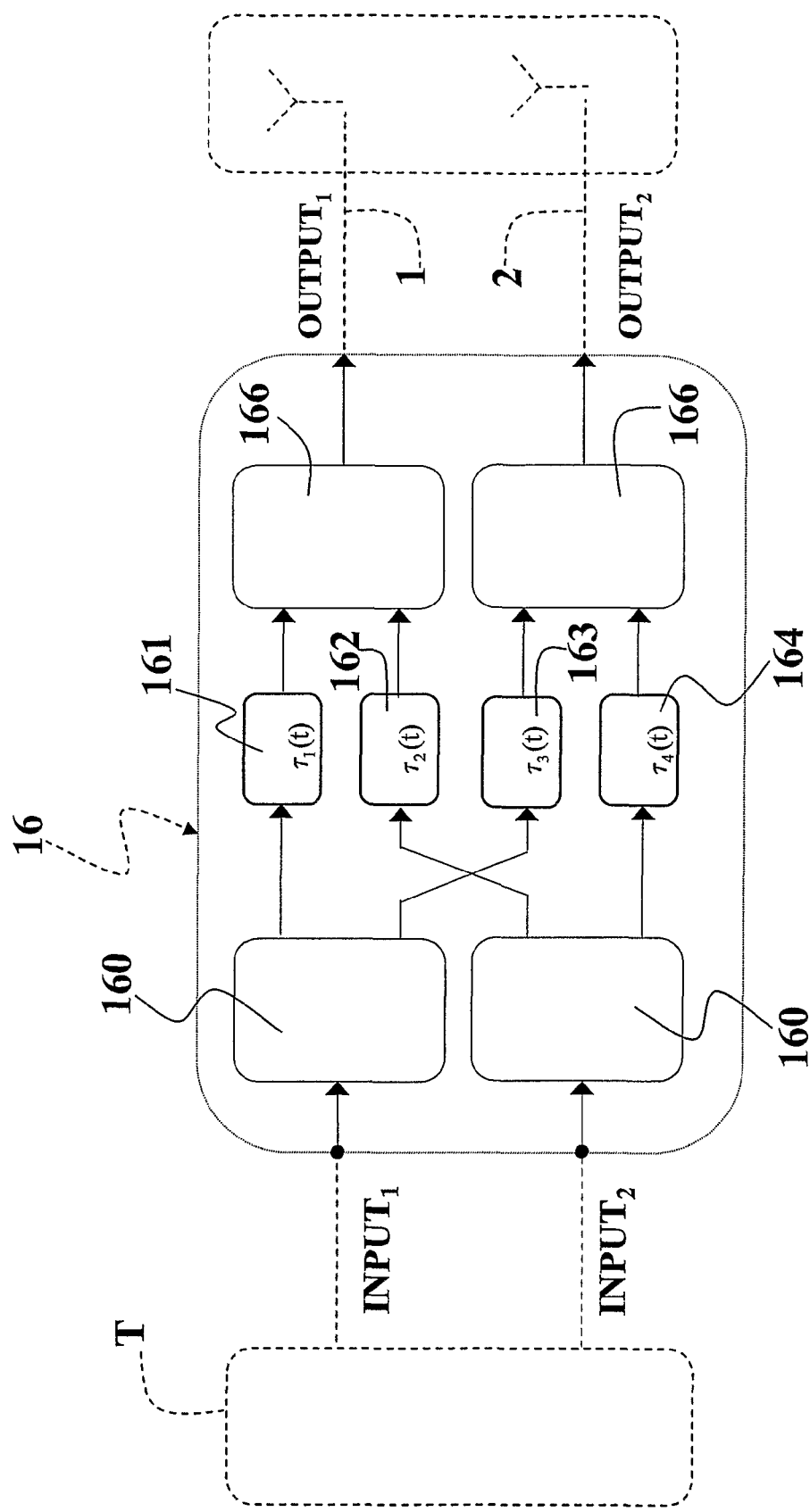
FIG. 3 is a schematic block diagram of a diversity arrangement as described herein when applied on the transmitter side.

A general implementation of a DDD TX processor 16 is shown in the block diagram of FIG. 3. The DDD TX processor is fed with the output signals of the conventional transmitter T and, after the DDD processing, the signals reach the transmission antennas 1, 2. The general structure of the DDD processor shown in FIG. 3 is employed when the conventional transmitter T supports by itself some form of transmission antenna diversity. In such a case the conventional transmitter T provides at the output two different RF signals that feed the two inputs of the DDD processor.

The DDD TX processor is composed of two signal splitters 160 that divide each input signal in two parts. Each of the four signals at the output of the splitters are provided to four Time Variant Delay Lines (TVDL) 161, 162, 163, and 164.

Each time variant delay line introduces on the corresponding RF signal a delay $\tau_n(t)$ ($1 \leq n \leq 4$) that varies between zero and a maximum value in the order of the carrier period $T_0$. The signals at the output of the four TVDLs 161, 162, 163, and 164 are then combined in two pairs by means of two RF combining units (combiners 166) and subsequently feed the antennas 1, 2 for radio transmission.

The arrangement illustrated, as applied to signals being transmitted by means of the two diversity antennas 1, 2 involves:
- splitting (at 160) each of the two signals being transmitted $INPUT_1$, $INPUT_2$ over respective transmission paths (to the number of four, as a whole) towards the diversity antennas 1, 2, and
- combining (at 166) at each of the diversity antennas 1, 2 the respective transmission paths of the two signals being transmitted.

As will be demonstrated in the following, the various delay function $\tau_n(t)$ are selected in order to maximize the temporal variations of the signal to noise plus interference (SNIR) ratio measured at the receiver and/or to minimize the cross-correlation between the transmitted (transmit diversity) or received (receiver diversity) signals. It is possible to demonstrate that combining two signals that slightly differ in terms of delay creates an amplitude-modulated signal that fades periodically. This effect determines a reduction of the Average Fade Duration (AFD) at the receiver, which measures how long the signal envelope or power stays below a given target threshold, and thus brings an improvement of the signal demodulation performance at the receiver.

FIG. 4a shows a first exemplary implementation of any of the TVDLs (e.g. those indicated by 161 to 164 in FIG. 3) in the form of a tapped delay line, namely as the cascade of elementary delay units $T_D$. Each such delay unit (e.g. a transmission line stub) may generate a delay $T_D$ of, say, 0.1 ns. The various tap points in the line come down to a RF switch 18. The switch is controlled by a delay control unit DCU making it possible to select a particular tap of the tapped delay line and therefore a given value of the delay produced by the block. Changing the position of the switch makes it possible to change the value of the delay applied to the output signal O with respect to the input signal I.

By resorting to the arrangement illustrated in FIG. 4a, the variable time delays (TVDLs) are generated by providing a cascaded elementary delay units ($T_D$) and selectively varying the number of elementary delay units included in the cascade. This is preferably provided in the form of a tapped delay line comprised of elementary delay units in a cascaded arrangement, and the switch 18 selectively contacts the tap points in the tapped delay line, whereby changing the position of the switch 18 changes the value of the delay.

FIG. 4b shows a second exemplary implementation of the delay line in the form of a plurality of delay elements $TD_1$, $TD_2$, ..., $TD_N$. These may again be comprised of transmission line stubs) each producing a respective delay of e.g. TD1=0.1 ns., TD2=0.2 ns., TD3=0.3 ns., and so on. Two switches 181, 182 are controlled in a coordinated manner by the delay control unit DCU making it possible to select a particular delay element and therefore a given value of the delay introduced by the block. Changing the position of the switches makes it possible to change the value of the delay, applied to the output signal O with respect to the input signal I. Typically, this delay is varied in the range between tenths of nanoseconds (ns) and units of nanoseconds (ns).

As an alternative to varying the delay in discrete steps, as shown in connection with the exemplary embodiments of FIG. 4a and FIG. 4b, in other possible implementations of the time variant delay line the delay is caused to vary continuously. A possible, implementation of the delay line with continuous variation of the introduced delay can be found in the article "*Time Delay Phase Shifter Controlled by Piezoelectric Transducer on Coplanar Waveguide*", IEEE Microwave and Wireless Components Letters, Vol. 13, No. 1, pag. 19-20, January 2003. In particular, the continuous delay line may be implemented by inserting on a coplanar waveguide a piezoelectric transducer whose perturbations vary the effective dielectric constant of the coplanar waveguide.

Figure 5:
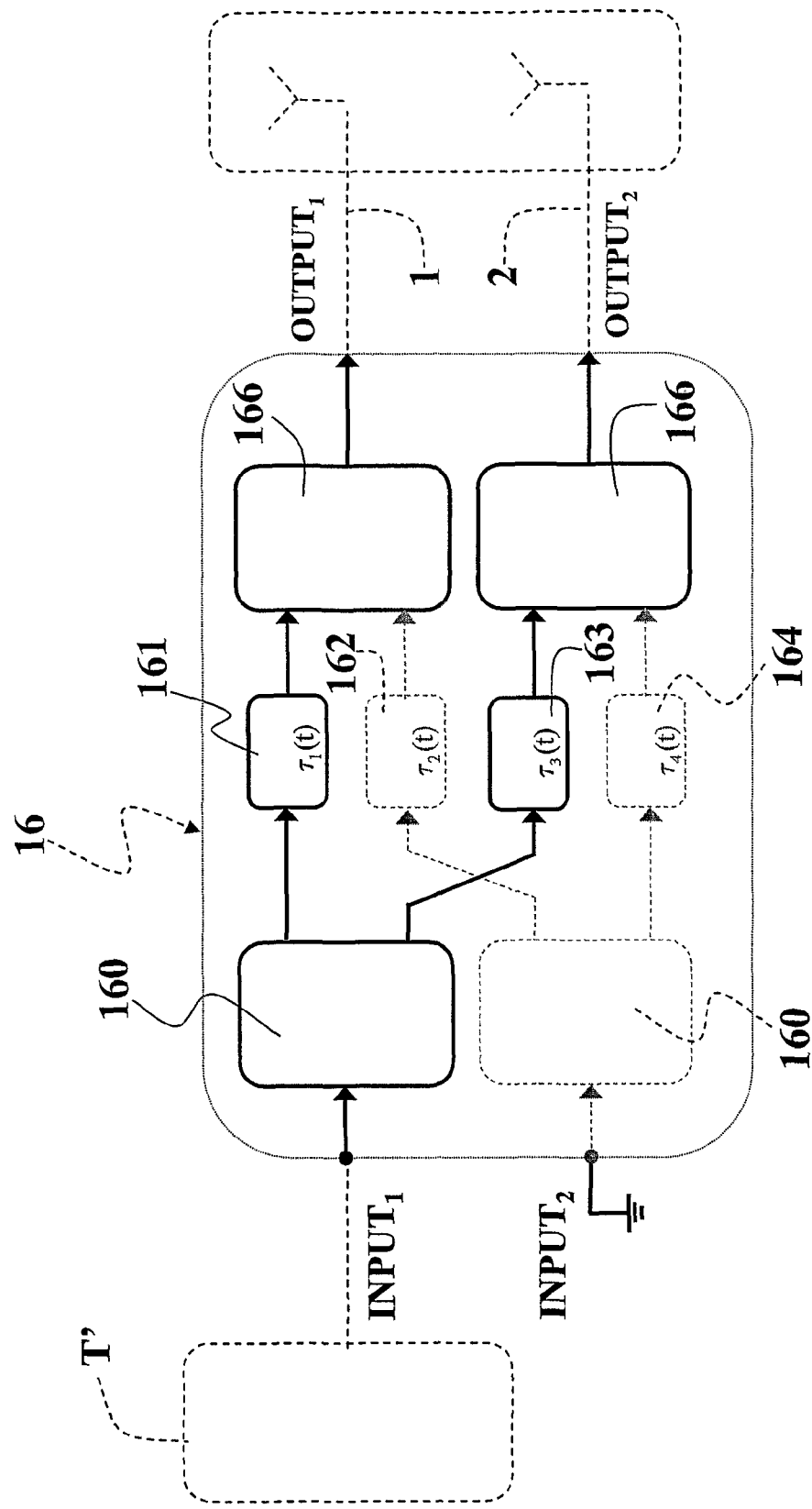
FIGS. 5 and 6 are schematic block diagrams of possible variants of use and implementation of a diversity arrangement as described herein when applied on the transmitter side.

The block diagram of FIG. 5 refers to the case of a conventional transmitter T' that does not support any transmission diversity technique. The transmitter T' provides in this case a single RF output signal that is provided to one input of the DDD TX processor, while the second input of the DDD TX processor is not fed with any signal (i.e. it is connected to ground). The representation of FIG. 5 is intended to highlight that the general structure of the DDD processor illustrated in FIG. 3 can be still used (in a "degenerated" manner as shown in FIG. 5), even though some of the RF-components, represented using dashed lines, are not essential for the operation of the diversity processor.

Figure 6:
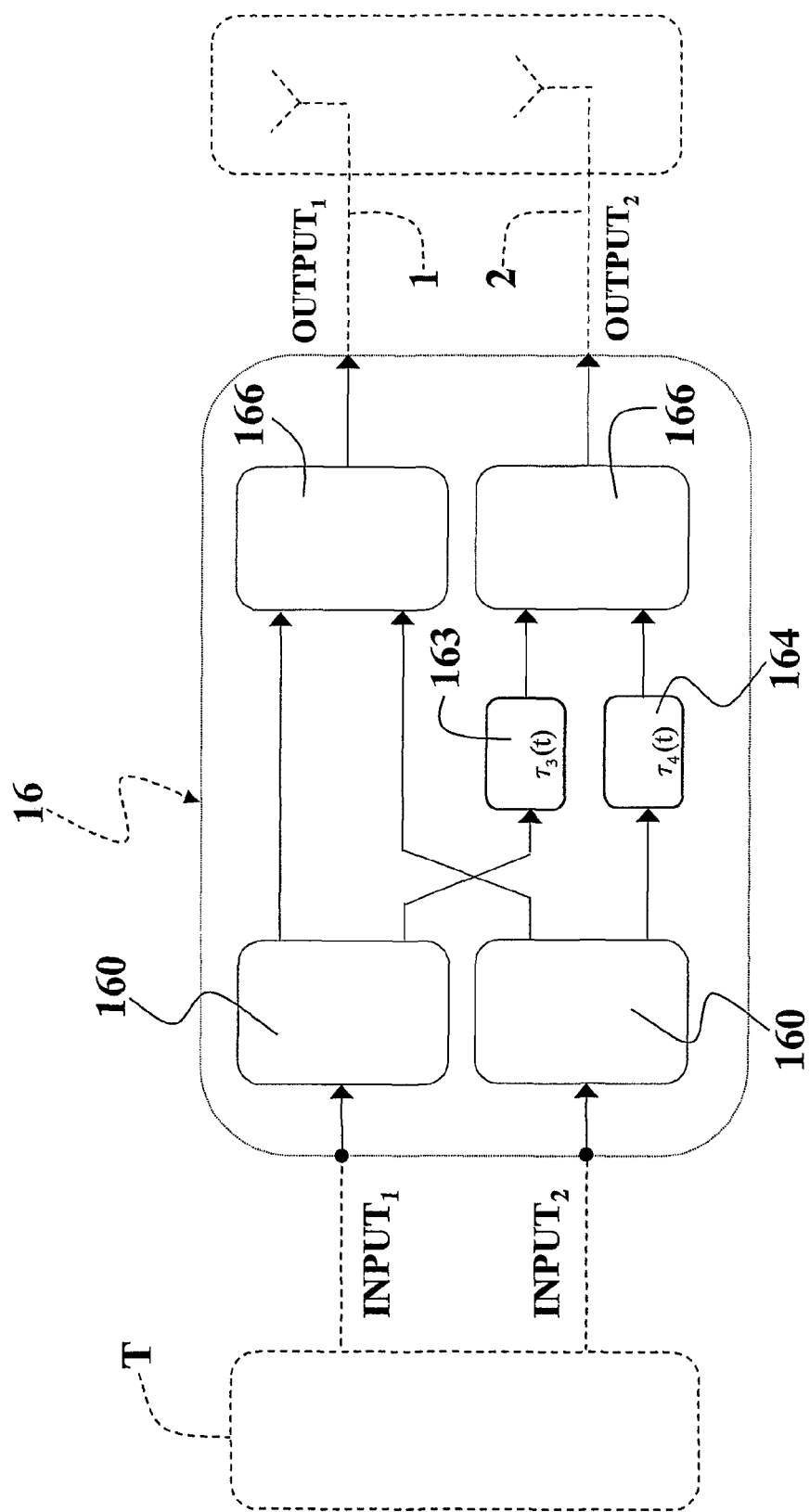

A third possible structure of a DDD TX processor 16 is shown in FIG. 6. In this case only two time variant delay lines 163, 164 are, used while the other two delay lines are replaced with a wire connection. With a proper choice of the delay functions $\tau_3(t)$ and $\tau_4(t)$, the DDD TX processor works as a signal decorrelator by providing two output signals that have a lower cross-correlation coefficient than the cross-correlation coefficient of the two input signals.

In particular the DDD TX processor works as a signal decorrelator by using two delay functions $\tau_3(t)$ and $\tau_4(t)$ that satisfy the following condition $$\tau_4(t) = \tau_3(t) + \frac{T_0}{2} \tag{2}$$

where $T_0$ is the carrier period. An example of delay functions, applicable with the DDD TX processor 16 of FIG. 6, which satisfy the condition (2) are shown in FIG. 7.

In view of the relationship (2) above, the structure of the DDD TX processor 16 shown in FIG. 6 can be further simplified as shown in FIG. 8. There, the two time variant delay lines 163, 164 illustrated in FIG. 7 are replaced by the combination of:
- a delay element 165 having a fixed delay equal to $T_0/2$, realized for example with a half wavelength transmission line stub, arranged on the portion of the propagation path of the input signal INPUT2 to the antenna 2, and
- a single TVDL 164 inserted, after the combiner 166, namely on that portion of the propagations paths of the input signals $INPUT_1$ and $INPUT_2$ to the antenna 2 that is common to both signals.

The following is a description of the application of the DDD technique described herein as a receiver diversity technique. A general implementation of the DDD RX processor 26 is shown in the block diagram of FIG. 9. The DDD RX processor is fed with the signals received by the antennas 1, 2 and, after the DDD processing, the signals are provided to a conventional receiver R for the subsequent demodulation. The general structure of the DDD processor as shown in FIG. 9 is employed when the conventional receiver R is equipped with two separate radio chains that allow the independent demodulation of two signals.

The DDD RX processor 26 is composed of two signal splitters 260 that divide in two parts the signals received from the antennas. Each of the four signals at the output of the splitters are provided to four Time Variant Delay Lines (TVDL) 261, 262, 263, and 264. Each time variant delay line 261, 262, 263, and 264 introduces on the corresponding RF signal a delay $\tau_n(t)$ ($1 \leq n \leq 4$) that varies between zero and a maximum value in the order of the carrier period $T_0$. The signals at the output of the four TVDLs 261, 262, 263, and 264 are then combined in two pairs by means of two RF combining units (combiners 266) and subsequently feed the two inputs of the conventional receiver R.

Figure 9:
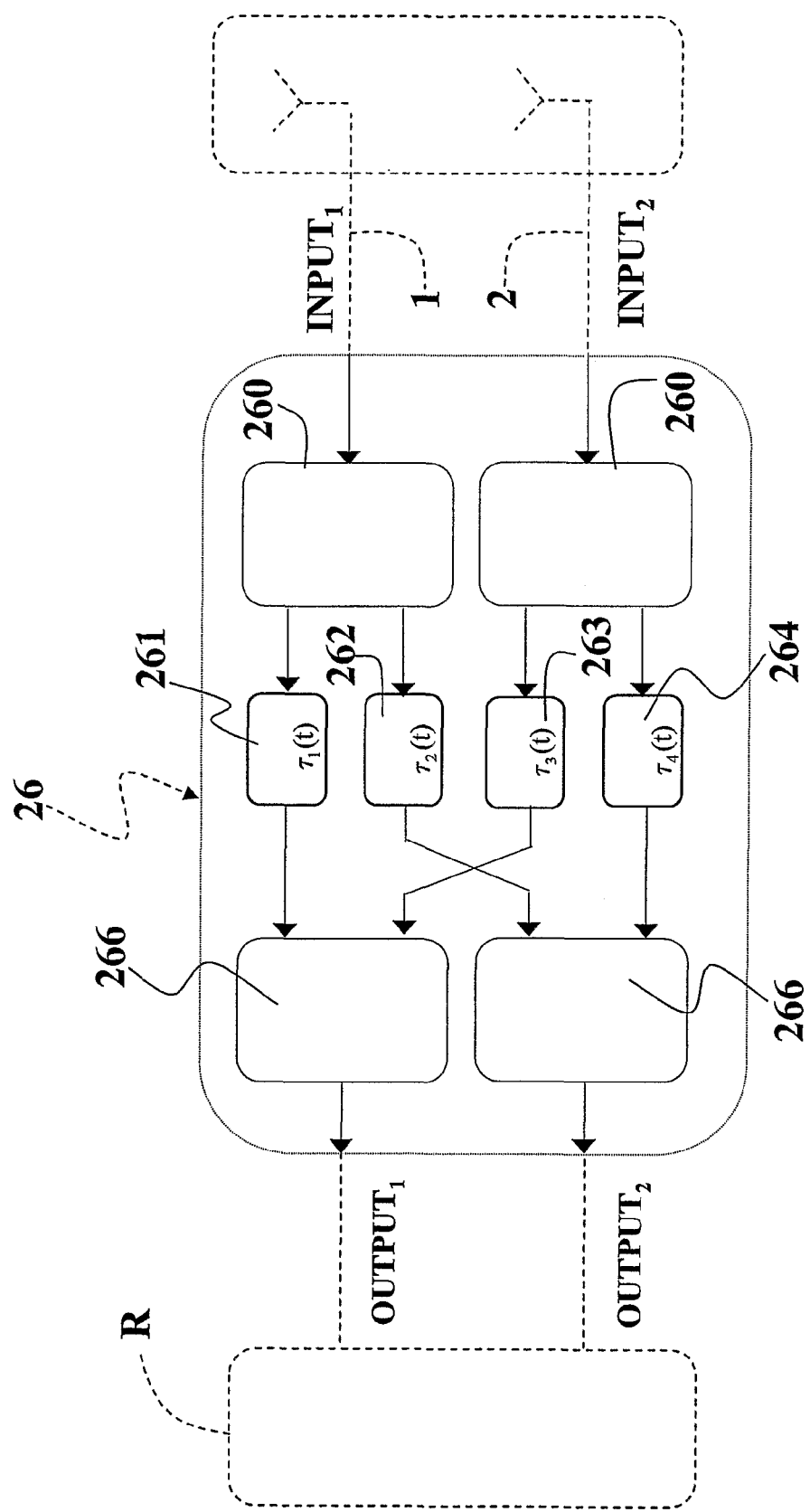

The arrangement illustrated in FIG. 9, as applied to signals being received by means of the two diversity antennas 1, 2, involves:
- splitting (at 260) each of the two signals being received $INPUT_1$, $INPUT_2$ over respective reception paths (again to the number of four, as a whole) from the diversity antennas 1, 2, and
- combining (at 266) the respective reception paths of the two signals being received froth different ones of the two diversity antennas 1, 2.

The performance improvement introduced by the DDD RX processor 26 can be explained by calculating the average and the instantaneous Signal to Noise Ratio (SNR) of the signals at the output of the processor. The general input-output signal transfer function of the DDD RX processor can be expressed as follows $$\begin{cases} z_1(t) = y_1[t - \tau_1(t)] + y_2[t - \tau_3(t)] \\ z_2(t) = y_1[t - \tau_2(t)] + y_2[t - \tau_4(t)] \end{cases} \quad (3)$$

where $y_1(t)$ and $y_2(t)$ are the signals received at the two antennas, $z_1(t)$ and $z_2(t)$ are the signals at the output of the DDD RX processor.

For the sake of simplicity, the following analysis considers a single frequency component, with frequency $f_0$, located in the center of the signal bandwidth B. However by using the linear superposition principle, the analysis can be generalized for a wideband signal with bandwidth B. In order to simplify the calculations one may refer to the complex envelopes of the corresponding signals. Again for sake of simplicity, it is assumed that the various RF components do not introduce distortions or signal losses.

By referring to the scheme of FIG. 9, the complex envelope at the frequency $f_0$ of the output signals $z_1(t)$ and $z_2(t)$ can be written as follows $$\tilde{z}_1(t) = \tilde{y}_1(t) \cdot e^{j\phi_1(t)} + \tilde{y}_2(t) \cdot e^{j\phi_3(t)} \quad (4)$$

$$\tilde{z}_2(t) = \tilde{y}_1(t) \cdot e^{j\phi_2(t)} + \tilde{y}_2(t) \cdot e^{j\phi_4(t)} \quad (5)$$

where the instantaneous phase shifts $\phi_j(t)$ applied on the j-th signals is equal to $$\phi_j(t) = 2\pi f_0 \tau_j(t) \quad (6)$$

The equation (4) can be further expanded by expressing the two received signals $\tilde{y}_1(t)$ and $\tilde{y}_2(t)$ as the sum of a useful term $\tilde{s}_i(t)$ and a disturbing term $\tilde{n}_i(t)$ representing the sum of thermal noise and interference $$\tilde{z}_1(t) = [\tilde{s}_1(t) + \tilde{n}_1(t)] \cdot e^{j\phi_1(t)} + [\tilde{s}_2(t) + \tilde{n}_2(t)] \cdot e^{j\phi_3(t)} \quad (7)$$

The average SNR of the signal at the first output of the DDD RX processor 26 is then given by $$SNR_{OUT_1} = \frac{E\{\|\tilde{s}_1(t) \cdot e^{j\varphi_1(t)} + \tilde{s}_2(t) \cdot e^{j\varphi_3(t)}\|^2\}}{E\{\|\tilde{n}_1(t) \cdot e^{j\varphi_1(t)} + \tilde{n}_2(t) \cdot e^{j\varphi_3(t)}\|^2\}} \quad (8)$$

where $\|a(t)\|^2 = a(t) \cdot a(t)^*$ is the squared norm of the signal $a(t)$ and $E\{\bullet\}$ here denotes the time average (mean value) operator. Starting from the equation (8), and assuming a particular case wherein the received signals are statistically independent, it is possible to demonstrate that the average SNR of each signal at the output of the DDD RX processor 26 is equal to the average SNR measured at each receiving antenna so that it is possible to write $$SNR_{OUT_1} = SNR_{ANT1} = \frac{E\{\|\tilde{s}_1(t)\|^2\}}{E\{\|\tilde{n}_1(t)\|^2\}} = SNR_{ANT2} = \frac{E\{\|\tilde{s}_2(t)\|^2\}}{E\{\|\tilde{n}_2(t)\|^2\}} \quad (9)$$

However, by considering the instantaneous value of the SNR at the output of the DDD RX processor 26 one obtains that the SNR depends both on the instantaneous attenuation of the propagation channel, which affects the instantaneous amplitude of the received signals $\tilde{s}_i(t)$ and $\tilde{n}_i(t)$ but it depends also on the phase functions $e^{j\phi_1(t)}$ and $e^{j\phi_3(t)}$ introduced by the DDD technique at the receiver $$SNR_{OUT_1}(t) = \frac{\|\tilde{s}_1(t) \cdot e^{j\varphi_1(t)} + \tilde{s}_2(t) \cdot e^{j\varphi_3(t)}\|^2}{\|\tilde{n}_1(t) \cdot e^{j\varphi_1(t)} + \tilde{n}_2(t) \cdot e^{j\varphi_3(t)}\|^2} \quad (9A)$$

As a consequence, by properly selecting the phase functions $e^{j\phi_1(t)}$ and $e^{j\phi_3(t)}$ it is possible to induce a variation of the instantaneous SNR at the receiver and thus reduce the mean fade duration in low mobility environments.

The performance improvement introduced by the DDD RX processor can be also demonstrated by calculating the cross-correlation of the signals at the output of the processor. In fact, the DDD RX processor 26 of FIG. 9 operates as a decorrelator, by providing two output signals that have a lower cross-correlation value than the cross-correlation value of the input signals. For simplicity one may again consider in the following analysis a single frequency component, with frequency $f_0$, located in the center of the signal bandwidth B.

The amplitude cross-correlation between the signals $y_1(t)$ and $y_2(t)$ received at the antennas is denoted with $\rho_y$, while the cross-correlation $\rho_z$ between the two output signals $z_1(t)$ and $z_2(t)$ is calculated as follows $$\rho_z = E\{\tilde{z}_1(t) \cdot \tilde{z}^*_2(t)\} \quad (10A)$$

The reduction of the cross-correlation can be demonstrated by using the general expressions (4) and (5) of the two output signals and imposing, for example, the following design conditions $$\phi_1(t) = 2 \cdot \omega \cdot t + \pi/2$$

$$\phi_2(t) = 4 \cdot \omega \cdot t + 3 \cdot \pi/2$$

$$\phi_3(t) = 2 \cdot \omega \cdot t + \pi/4$$

$$\phi_4(t) = 4 \cdot \omega \cdot t + \pi/4 \quad (10B)$$

This particular example uses linear phase function $\phi_n(t)$ varying cyclically between 0 and $2\pi$ with different angular frequencies. However, other phase functions can be used in order to obtain two output signals that have a lower cross-correlation value than the cross-correlation value of the input signals.

By substituting the expressions (4), (5) and (10B) in the equation (10A) one then obtains the final expression of the output cross-correlation $$\rho_z = 2 \cdot j \cdot e^{j\pi/4} E\{Im[\rho_y \cdot e^{-j\omega t}]\} \quad (10C)$$

where the symbol Im[.] denotes the imaginary part of the argument. The equation (10C) indicates that, when the input signals are correlated (i.e. $\rho_y > 0$) the cross-correlation between the two output signals $\rho_z$ can be reduced to zero. In fact, the average of the sinusoidal function in the equation (10C) makes the output cross-correlation equal to zero $$E\{Im[\rho_y \cdot e^{-j\omega t}]\} = E\{-Re(\rho_y) \cdot \sin(\omega t) + Im(\rho_y) \cdot \cos(\omega t)\} = 0 \quad (10D)$$

where the symbol Re[.] denotes the real part of the argument.

The generalization of the previous demonstration to a wideband signal is straightforward, taking into account the relationship between the delays introduced on the signals and the corresponding phase shifts as a function of frequency.

$$\phi_n(t) = 2\pi f \tau_n(t) \quad (10E)$$

For example a linear phase function varying cyclically between 0 and $2\pi$ can be obtained by inserting a linear delay function varying between 0 and the period of the carrier frequency $T_0 = 1/f_0$, where $f_0$ is the central frequency within the signal bandwidth B. A fixed phase shift of e.g. $\pi/2$ is instead obtained by inserting a fixed delay of $T_0/4$. Accordingly, the different angular frequencies of the phase functions in (10b) correspond to different time periods $T_p$ of the delay functions. Examples of these linear delay functions are provided in FIG. 7.

Figure 10:
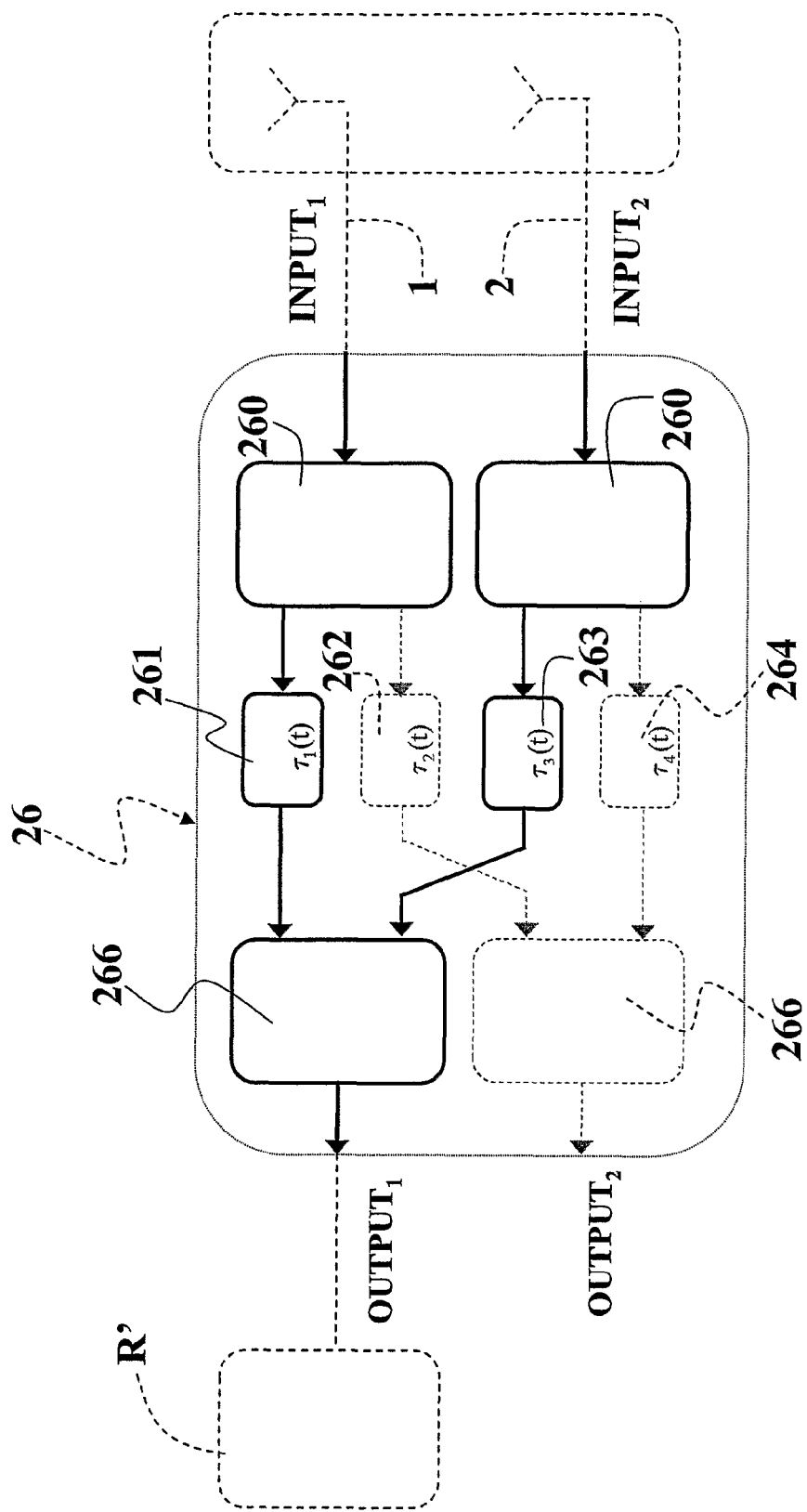

The DDD RX processor 26 described herein can also be used to improve the radio link performance of wireless systems that in origin are not designed to support receiver diversity. In this case the conventional receiver R' is equipped with a single radio chain and thus only one RF signal can be demodulated. The support of the receive diversity is obtained by exploiting only one output signal of the RX diversity processor, as shown in FIG. 10. In this particular system configuration, the general structure of the DDD RX processor 26 of FIG. 9 can still be used as shown in FIG. 10, even though some of the RF components, represented using dashed lines, are not essential for the operation of the diversity processor.

Figure 11:
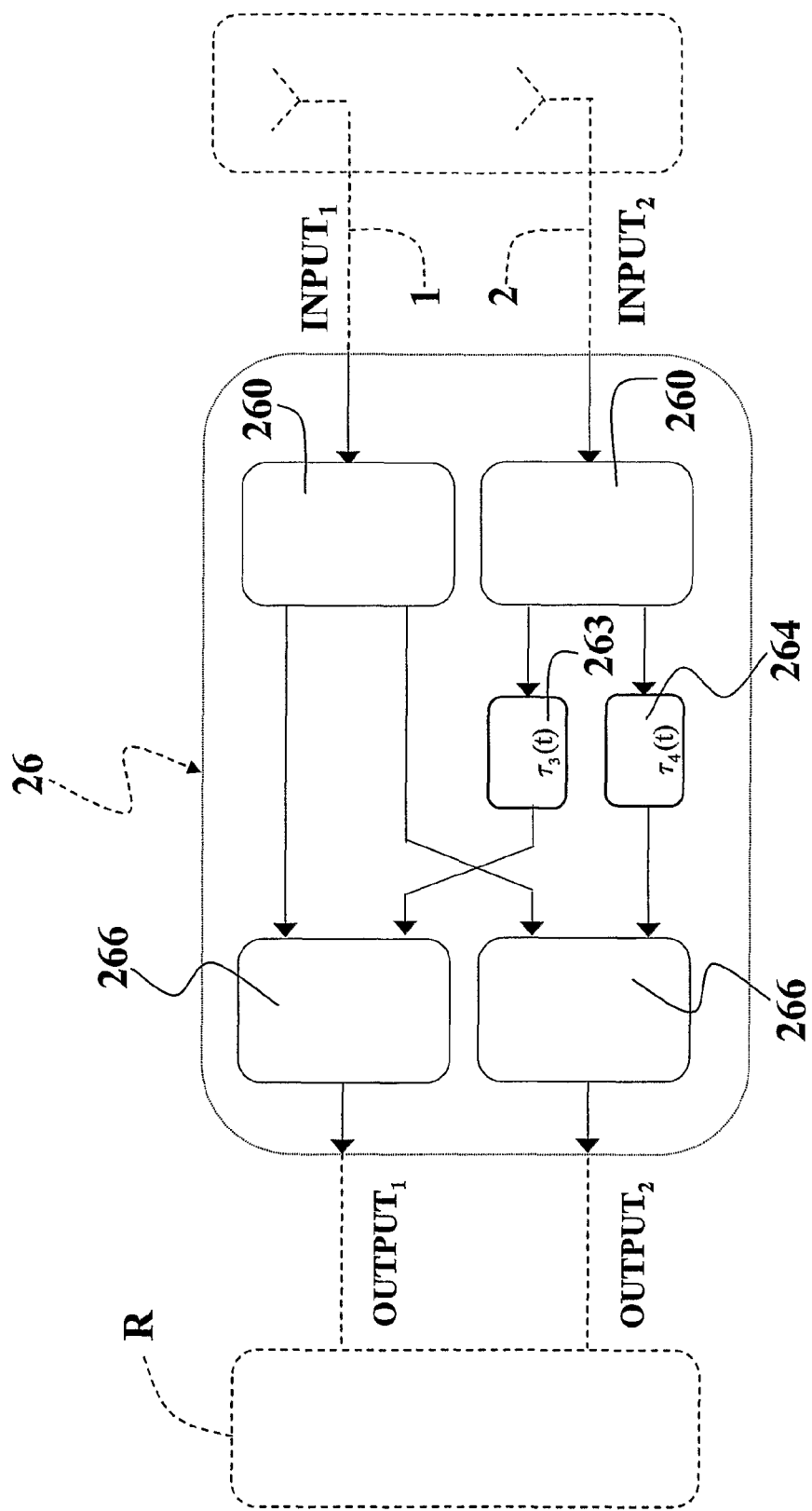

A third possible structure of the DDD RX processor 26 is shown in FIG. 11. In this case only two time variant delay lines 263, 264 are used while the other two delay lines are replaced with a wire connection. With a proper choice of the delay functions $\tau_3(t)$ and $\tau_4(t)$, the DDD RX processor of FIG. 11 operates as a signal decorrelator by providing two output signals that have a lower cross-correlation value than the cross-correlation value of the two input signals.

In particular the DDD RX processor of FIG. 11 operates as a signal decorrelator by using two delay functions $\tau_3(t)$ and $\tau_4(t)$ that satisfy the following condition $$\tau_4(t) = \tau_3(t) + \frac{T_0}{2} \quad (11)$$

where $T_0$ is the carrier period. Two delay functions shown in FIG. 7, which satisfy the condition (11), are again applicable with the DDD RX processor of FIG. 11. The delay functions $\tau_n(t)$ are designed such that the delay variation over a symbol period is significantly small compared to the carrier period $T_0$. In case of a CDMA system this design criteria ensures that there is a minimal energy loss in the sum and dump operations. Moreover, as previously explained, the delay functions $\tau_n(t)$ are also chosen in order to introduce a sufficient variability of the received SNR within the interleaving period. For example in case of the UMTS system, which has an interleaving period ranging from 10 to 80 ms, a possible choice of the period of the delay functions $T_p$ is in the order of 10÷20 ms.

Figure 12:
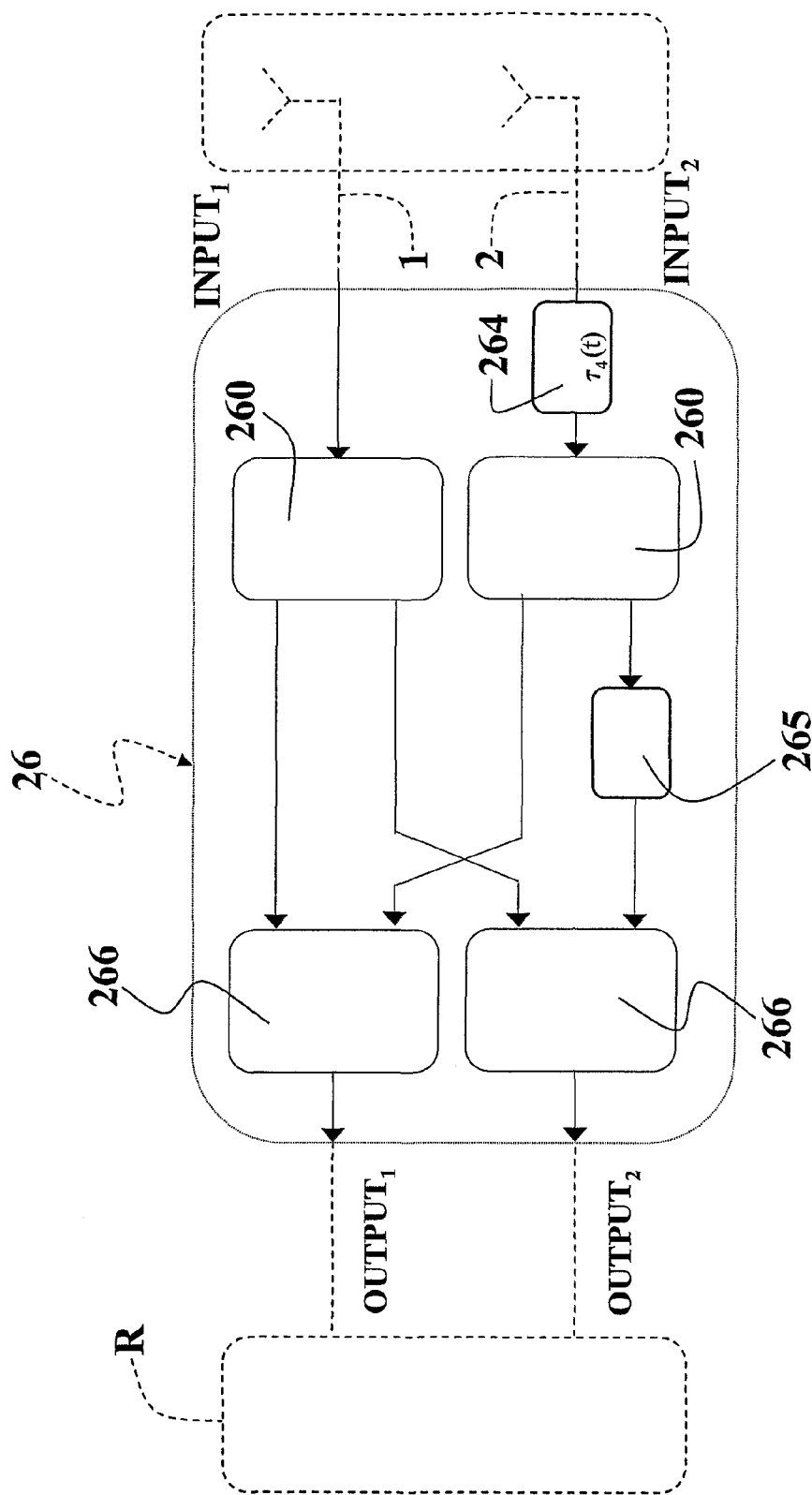

In view of the relationship (11) above, the structure of the DDD RX processor shown in FIG. 11 can be further simplified as shown in FIG. 12. In particular, the two time variant delay lines 263, 264 of FIG. 11 are replaced by the combination of:
 a delay element 265 having a fixed delay equal to $T_0/2$, realized for example with a half wavelength transmission line stub, arranged on the portion of the propagation path of the input signal INPUT2 from the antenna 2 (i.e. downstream of the splitter 260), and
 a single TVDL 264 inserted upstream of the splitter, namely on that portion of the propagation paths of the output signals $OUTPUT_1$ and $OUTPUT_2$ from the antenna 2 that is common to both signals.

The DDD RX processor 26 of either of FIG. 11 or 12 operates as a decorrelator, by providing two output signals that have a lower cross-correlation value than the cross-correlation value of the input signals. For simplicity one may, again consider in the following analysis a single frequency component, with frequency $f_0$, located in the center of the signal bandwidth B.

The amplitude cross-correlation between the signals $y_1(t)$ and $y_2(t)$ received at the antennas is denoted with $\rho_y$, while the cross-correlation $\rho_z$ between the two output signals $z_0(t)$ and $z_2(t)$ is calculated as follows $$\rho_z = E\{\tilde{z}_1(t) \cdot \tilde{z}^*_2(t)\} \quad (12)$$

The reduction of the cross-correlation can be demonstrated by using the general expressions (4) and (5) of the two output signals and imposing, as design condition, that the phase difference between $\phi_3(t)$ and $\phi_4(t)$ is constant and equal to 180 degrees $$\phi_1(t) - \phi_2(t) = 0$$

$$\phi_4(t) = \phi_3(t) + \pi \quad (13)$$

By substituting the expressions (4), (5) and (13) in the equation (12) one then obtains the final expression of the output cross-correlation $$\rho_z = -\rho_y \cdot E\{\cos[\phi_3(t)] - j\sin[\phi_3(t)]\} + \rho^*_y \cdot E\{\cos[\phi_3(t)] + j\sin[\phi_3(t)]\} \quad (14)$$

The equation (14) indicates that, when the input signals are correlated (i.e. $\rho_y > 0$) the cross-correlation between the two output signals $\rho_z$ can be reduced to zero. In particular, by selecting a phase function $\phi_3(t)$ that satisfies the following conditions $$E\{\cos[\phi_3(t)]\} = 0 \text{ and } E\{\sin[\phi_3(t)]\} = 0 \quad (15)$$

the value of output cross-correlation $\rho_z$ can be reduced to zero. For example, a linear phase function varying cyclically between 0 and $2\pi$ such as $$\phi_3(t) = m \cdot t \quad (16)$$

satisfies the conditions (15) and can be used in the present invention. However, other phase functions satisfying the condition (15) can be used in order to obtain the same result. The generalization of the previous demonstration to a wideband signal is straightforward, taking into account the relationship between the delay introduced on the signals and the corresponding phase shift as a function of frequency $$\phi_n(t) = 2\pi f \tau_n(t) \quad (17)$$

For example a linear phase function varying cyclically between 0 and $2\pi$ can be obtained by inserting a linear delay function varying between 0 and the period of the carrier frequency $T_0 = 1/f_0$, where $f_0$ is the central frequency within the signal bandwidth B. Correspondingly the design condition (13) can be rewritten in a similar relationship between the delay functions $$\tau_4(t) = \tau_3(t) + \frac{T_0}{2} \quad (18)$$

The DDD processors 16 and 26 described up to now are unidirectional devices that can be used separately for transmission or reception. However, by comparing the architectures of FIG. 3 (DDD TX processor 16) and FIG. 9 (DDD RX processor 26) it is evident that the two circuits are symmetrical.

As a consequence, a single DDD TX/RX processor 126, implemented with reciprocal components, can be used simultaneously both for transmission and reception. The same consideration holds for the other architectures such those shown in FIG. 5 and FIG. 10, used together with conventional transceivers that do not support transmit or receive diversity. Similarly the architectures in FIG. 6 and FIG. 11 that work as signal decorrelators have symmetrical structures.

FIG. 13 shows the general structure of a DDD TX/RX processor 126 realized with reciprocal components that can be used simultaneously for transmission and reception. Specifically, two first reciprocal elements 1260 may act as splitters and combiners, when the processor 126 acts as a transmitter and a receiver, respectively. Similarly, two further reciprocal elements 1266 may act as combiners and splitters, when the processor 126 acts as a transmitter and a receiver, respectively. Four TVDLs 1261, 1262, 1263, and 1264 that are intrinsically reciprocal elements—are interposed between the first and second reciprocal elements 1260 and 1266.

The block labelled as TR in FIG. 13 and in the next figures represents a unit that includes the functionalities of both the conventional transmitter and conventional receiver detailed in FIG. 1 and FIG. 2 respectively.

FIG. 14 shows the architecture of the DDD TX/RX processor 126 realized with reciprocal components and using only two TVDLs 1263, 1264. Similarly, FIG. 15 shows a further simplified structure of the DDD TX/RX processor 126 that is used as signal decorrelator, implemented by using only reciprocal components, including a single TVDL 1264 interposed between the second pair of elements 1266 and the antenna 2 and fixed ($T_0/2$) delay element 1265, interposed between the first and second pairs of elements 1260 and 1266

The various implementations of the DDD processors described herein can be combined in order to obtain different system architectures where the DDD processing is introduced both in transmission and reception.

For instance, FIG. 16 shows a first system architecture based on non-reciprocal DDD transmit and receive processors 16 and 26, respectively. The separation between transmit and receive paths between two transceivers $TX_1/RX_1$, $TX_2/RX_2$ and the antennas 1, 2 is obtained by means of two first duplexer elements 51, 52—at the transmitter/receiver side—and two second duplexer elements 61, 62 at the antenna side.

FIG. 17 shows a system architecture based on a reciprocal DDD processor 126 that is used simultaneously for transmission and reception between two transceivers $TX_1/RX_1$, $TX_2/RX_2$ and two antennas 1, 2.

FIG. 18 shows an asymmetric architecture based on non-reciprocal processors. This architecture includes a transceiver $TX_1/RX_1$ and a receiver $RX_2$ and thus comprises a single transmission unit while the receiver is equipped with two receiving units for supporting diversity. A reciprocal duplexer 150 is interposed between the transceiver $TX_1/RX_1$ and the non-reciprocal processors 16 and 26.

The basic principle of the DDD technique heretofore exemplified as performed at the RF level is also applicable at a different stage in the radio transmission chain such at the Base Band (BB) stage. The following is a description of the general structure of a DDD TX and RX processor suitable for the operation at Bathe Band Level.

This alternative application of the invention is suitable for communication networks that use Remote Radio Head (RRH) units. By direct reference to the block diagram of FIG. 19, a RRH is a compact unit 104 adapted to be mounted near an antenna (such as the antennas 1, 2 considered herein) that integrates several base station functions for transmission and reception.

The transmission functions that are typically integrated in the RRH unit are digital to analog conversion (DAC), frequency up-conversion, digital pre-distortion and MCPA (Multi Carrier Power Amplifier). The receiving functions that are integrated in the RRH are the RF front-end, frequency down-conversion and analog to digital conversion (ADC).

The RRH is fed from the remainder of the base station with baseband (I/Q) signals via a baseband modem 100 over optical fibre cables 102. The interface between the RRH 104 and the baseband modem 100 is normally compliant with the Common Public Radio Interface (CPRI) standard or with the interface defined by the OBSAI (Open Base Station Standard Initiative) forum. The baseband modem 100 can be relocated from a cabinet near to the antenna to a remote location with clear benefits in terms of deployment costs and network management.

Figure 20:
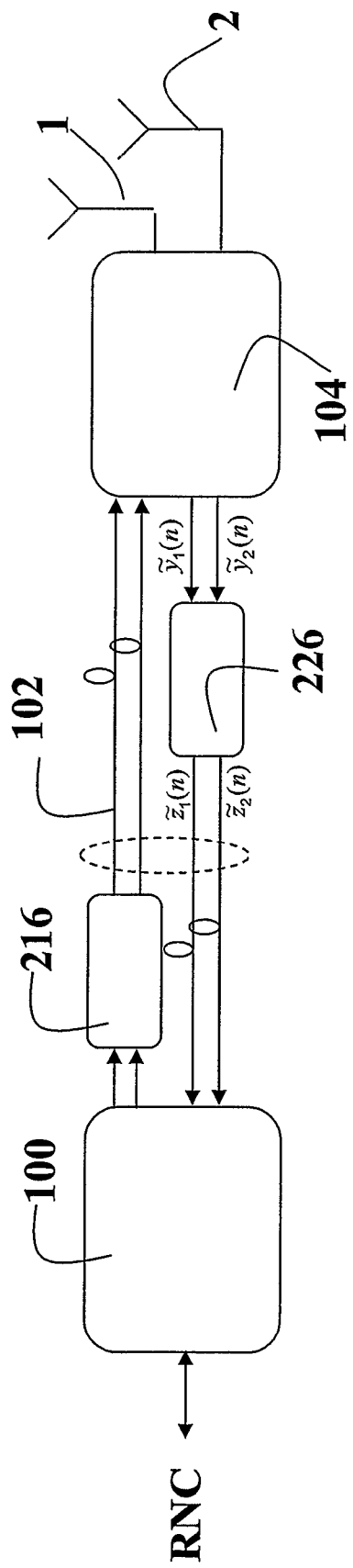
Figure 21:
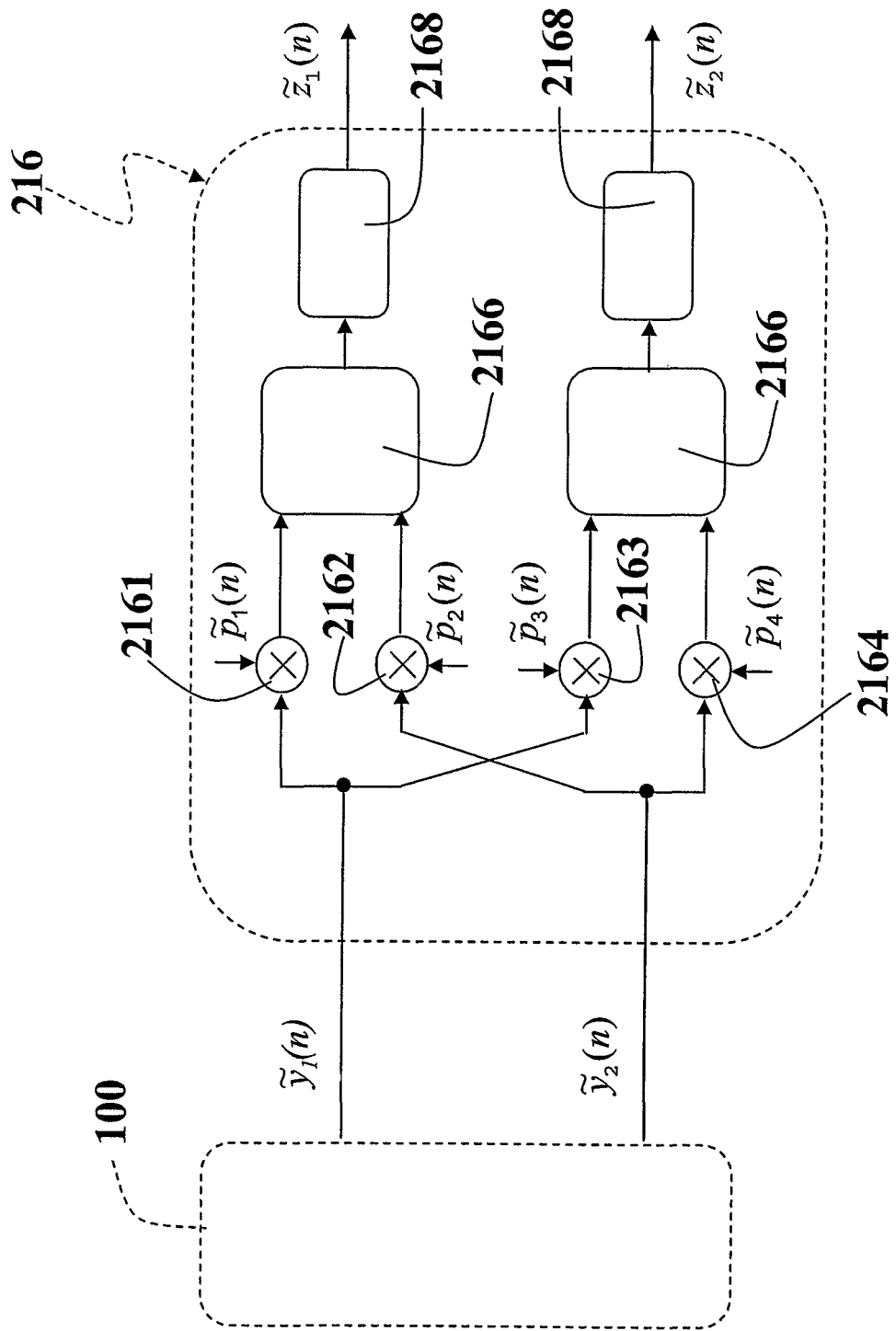
Figure 22:
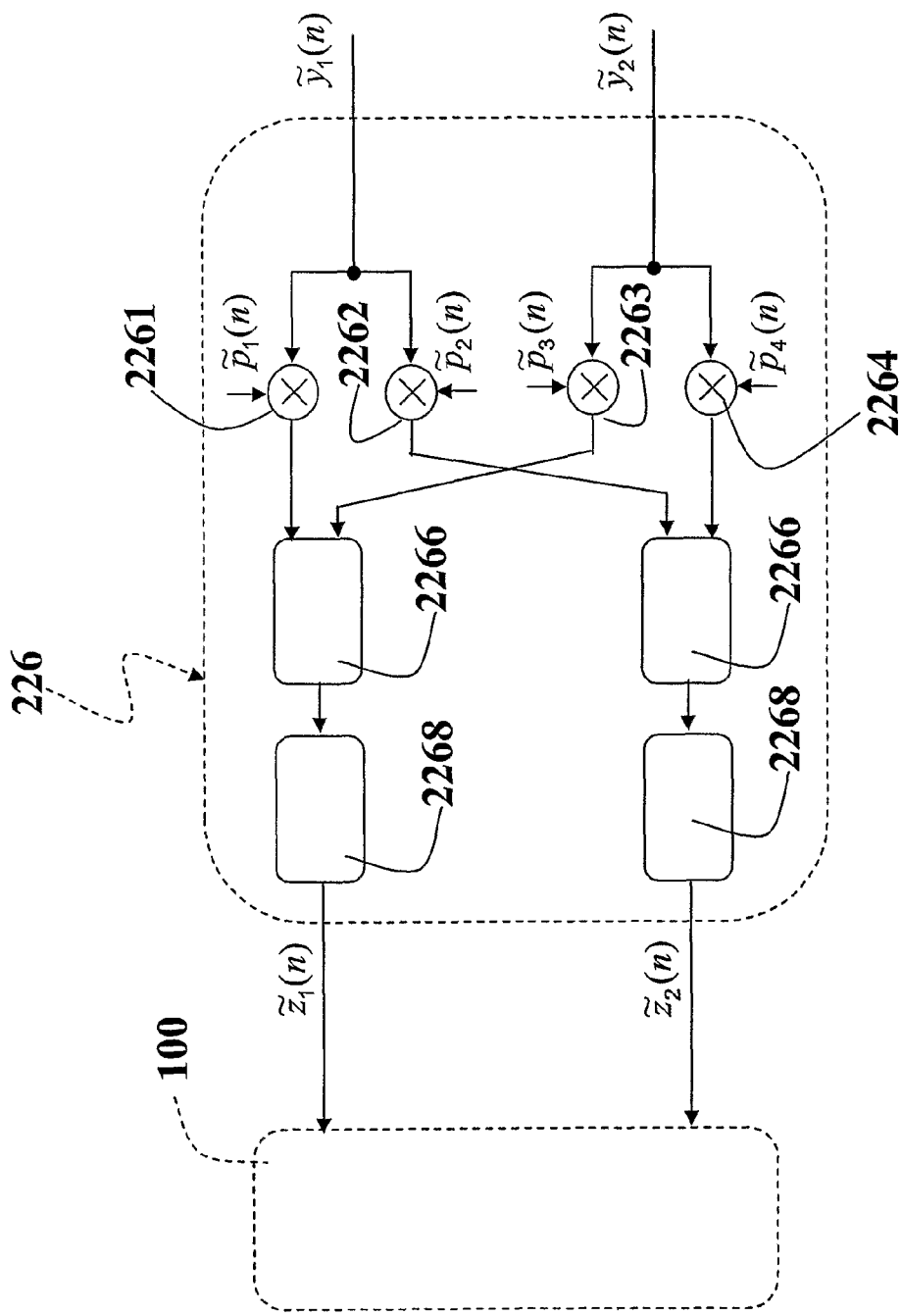

As previously observed, the application of the DDD technique can be extended to operate at baseband level in the digital domain. The signal processing operations are performed in this case at baseband level by means of a so-called DDD baseband processor. This unit represents an add-on digital module that can be easily integrated in the RRH 104 or, alternatively, in the baseband modem 100. In order to contemplate both these alternatives, the block diagram of FIG. 20 illustrates a DDD baseband transmission (TX) processor 216 and a DDD baseband reception (RX) processor 226 as separate elements arranged over the optical fibre connection 102 between the baseband modem 100 and the RRH 104. The general architectures of the DDD baseband TX processor 216 and of the DDD baseband RX processor 226 are shown in FIGS. 21 and 22 respectively.

The following is a detailed description of the principles underlying the structure and operation of the DDD baseband RX processor 226 and its application with a RRH arrangement. However, a thoroughly similar description applies—mutatis mutandis—to the DDD baseband TX processor 216. The DDD baseband RX processor 226 receives at its input two digital signals $\tilde{y}_1(n)$ and $\tilde{y}_2(n)$ from the main and diversity antennas 1,2 and provides as output the processed signals $\tilde{z}_1(n)$ and $\tilde{z}_2(n)$.

All the signals considered hereafter are digital complex signals, sampled at the frequency $F_S$ and quantized over a finite number of bits. By denoting with n the discrete time index (where $0 \leq n \leq \infty$), the two signals $\tilde{y}_1(n)$ and $\tilde{y}_2(n)$ can be also expressed as follows $$\tilde{y}_1(n) = Re\{\tilde{y}_1(n)\} + j \cdot Im\{\tilde{y}_1(n)\} = Re\{\tilde{y}_1(n \cdot T_S)\} + j \cdot Im\{\tilde{y}_1(n \cdot T_S)\} \quad (19)$$

$$\tilde{y}_2(n) = Re\{\tilde{y}_2(n)\} + j \cdot Im\{\tilde{y}_2(n)\} = Re\{\tilde{y}_2(n \cdot T_S)\} + j \cdot Im\{\tilde{y}_2(n \cdot T_S)\} \quad (20)$$

where $T_S = 1/F_S$ is the sampling period. The mathematical representation used for the two signals $\tilde{y}_1(n)$ and $\tilde{y}_2(n)$ is applicable to all the signals considered in the following description.

One notices that the four delay lines are replaced by four complex multipliers 2261, 2262, 2263, and 2264 (resp. 2161, 2162, 2163, and 2164, in the case of the TX processor 216 of FIG. 21). Each multiplier 2261, 2262, 2263, and 2264 receives at the first input one of the two signals $\tilde{y}_1(n)$ or $\tilde{y}_2(n)$ and, on the second input, a signal $\tilde{p}_i(n)$ with $1 \leq i \leq 4$. By properly selecting the four digital signals $\tilde{p}_i(n)$ it is possible to modify the phase of the two received signals $\tilde{y}_1(n)$ on $\tilde{y}_2(n)$ and therefore, to introduce the desired variation of the instantaneous SNR on the two output signals $\tilde{z}_1(n)$ and $\tilde{z}_2(n)$ together with the correspondent de-correlation effect.

This concept has been described previously for the application of the invention that operates at radiofrequency, but the same principle remains effective also at baseband. As an example, the signals $\tilde{p}_i(n)$ can be selected in order to introduce a linear phase variation on the two signals $\tilde{y}_1(n)$ or $\tilde{y}_2(n)$. In such a case the phase functions $\tilde{p}_i(n)$ can be expressed as follows $$\tilde{p}_1(n) = k_1 \cdot e^{j\left(2\pi \cdot \frac{f_{D1}}{F_s} \cdot n + \psi_1\right)} \quad (21)$$

$$\tilde{p}_2(n) = k_2 \cdot e^{j\left(2\pi \cdot \frac{f_{D2}}{F_s} \cdot n + \psi_2\right)} \quad (22)$$

$$\tilde{p}_3(n) = k_3 \cdot e^{j\left(2\pi \cdot \frac{f_{D3}}{F_s} \cdot n + \psi_3\right)} \quad (23)$$

$$\tilde{p}_4(n) = k_4 \cdot e^{j\left(2\pi \cdot \frac{f_{D4}}{F_s} \cdot n + \psi_4\right)} \quad (24)$$

where $k_i = 2^{N_i}$ is the amplitude factor that is introduced in order to allow the quantization of the functions $\tilde{p}_i(n)$ over $N_i + 1$ bits. The factor $f_{Di}$ represent the frequency according to which the phase varies and $\psi_i$ is the initial phase of each function $\tilde{p}_i(n)$. Clearly, the phase functions given by the equations (21)-(24) are just examples and other functions can be used in order to obtain the desired variation of the instantaneous SNR or to reduce to zero the correlation between the output signals $\tilde{z}_1(n)$ and $\tilde{z}_2(n)$.

According to the architecture of FIG. 22, the signals at the output of the multipliers 2261, 2262, 2263, and 2264 are then recombined by means of two complex adders 2266. In fact the RF combiners 266 of FIG. 9 are replaced with complex adders that operate on digital sampled signals. After the digital recombination the resolution of the signals is increased and thus it may be necessary to reduce this resolution by means of a scaling operation performed by means of signal scaling blocks 2268. The scaling operation reduces the number of bits necessary to represent a digital signal by eliminating some LSB (Least Significant bits) or MSB (Most Significant Bits) that can be neglected without adversely affecting system performance.

In the case of the transmitter processor 216 of FIG. 21, the signals at the output of the multipliers 2161, 2162, 2163, and 2164 are then recombined by means of two complex adders 2166. Here again, the RF combiners 166 of FIG. 3 are replaced with complex adders that operate on digital sampled signals. After the digital recombination the resolution of the signals is increased and thus it may be necessary to reduce this resolution by means of a scaling operation performed by means of signal scaling blocks 2168. The scaling operation reduces the number of bits necessary to represent a digital signal by eliminating some LSB (Least Significant bits) or MSB (Most Significant Bits) that can be neglected without adversely affecting system performance.

Like the DDD TX and RX processors operating at RF described in the foregoing, the general architectures of FIG. 21 and FIG. 22 can be simplified in order to obtain the other processor architectures, such the DDD processors that work as signal de-correlators by using only two multiplying units 2163, 2164 and 2263, 2264 instead of four and possibly only one multiplying unit 2164 and 2264 in combination with a sign inversion unit playing a role analogous to the role of the fixed delay elements 165, 265 of FIGS. 8 and 12.

Those of skill in the art will further promptly appreciate that the DDD processor arrangements described herein, both in the version operating at radiofrequency or at baseband, ideally lend themselves to use in wireless apparatus such as e.g. a base station or a mobile terminal equipped with two or more antennas.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A method of diversity processing at least two signals propagated via at least two diversity antennas, the two signals having a carrier frequency with a given period, comprising the steps of:

coupling each said at least two signals to each said at least two diversity antennas via respective signal propagation paths, thus giving rise to at least four propagation paths;

subjecting the signals propagating over at least two of said propagation paths to time variable delays; and continuously varying each of said time variable delays according to a periodic function and in a range between 0 and the given period of the carrier frequency, the delay from the function being less than ten nanoseconds, such that the cross-correlation between the signals propagated over said at least two propagation paths subject to said time variable delays is lower than the cross-correlation of said at least two signals to be propagated over said propagation paths.

2. The method of claim 1, comprising the step of subjecting to time variable delays the signals propagating over all of said signal propagation paths.

3. The method of claim 1, comprising the step of subjecting to time variable delays two signals propagating over two propagation paths associated with the same of said diversity antennas.

4. The method of claim 1, comprising the step of subjecting to time variable delays the signals propagating over at least two of said propagation paths by:
   providing, in the propagation paths for said at least two signals, respective distinct propagation portions and a combined propagation portion for said at least two signals;
   subjecting said at least two signals to a time variable delay over the common portion of said propagation paths; and
   subjecting one of said at least two signals to a fixed delay over the respective distinct portion of said propagation paths.

5. The method of claim 4, wherein said at least two signals have a carrier frequency with a given period, wherein said fixed delay is equal to half said given period.

6. The method of claim 4, applied to signals transmitted by means of said at least two diversity antennas comprising the steps of:
   splitting each of said at least two signals transmitted over respective transmission paths toward said diversity antennas; and
   combining at each of said diversity antennas the respective transmission paths of said at least two signals transmitted; and
   subjecting said one of said at least two signals to a fixed delay between said steps of splitting and combining; and
   further comprising the steps of:
   subjecting said at least two signals to a time variable delay either before said step of splitting or after said step of combining.

7. The method of claim 1, applied to signals transmitted by means of said at least two diversity antennas, comprising the steps of:
   splitting each of said at least two signals transmitted over respective transmission paths toward said diversity antennas; and
   combining at each of said diversity antennas the respective transmission paths of said at least two signals transmitted.

8. The method of claim 7, comprising the step of subjecting said signals to time variable delays between said steps of splitting and combining.

9. The method of claim 1, applied to signals received by means of said at least two diversity antennas, comprising the steps of:
   splitting each of said at least two signals received over respective reception paths from said diversity antennas; and
   combining the respective reception paths of said at least two signals received from different antennas of said at least two diversity antennas.

10. The method of claim 1, applied to signals transmitted and received by means of said at least two diversity antennas, comprising the steps of:
    splitting each of said at least two signals transmitted over respective transmission paths toward said diversity antennas;
    splitting each of said at least two signals received over respective reception paths from said diversity antennas;
    combining at each of said diversity antennas the respective transmission paths of said at least two signals transmitted; and
    combining the respective reception paths of said at least two signals received from different antennas of said at least two diversity antennas,
    wherein said steps of splitting and combining are performed by means of reciprocal elements.

11. A non-transitory computer-readable medium encoded with a computer program that, when loaded into a memory of at least one computer, performs the method of claim 1.

12. A system for diversity processing at least two signals propagated via at least two diversity antennas, the two signals having a carrier frequency with a given period, comprising:
    at least four respective propagation paths coupling each said at least two signals to each said at least two diversity antennas; and
    time variable delay elements for subjecting to time variable delays the signals propagating over at least two of said propagation paths,
    wherein each of said time variable delays are continuously varied according to a periodic function and in a range between 0 and the given period of the carrier frequency, the delay from the function being less than ten nanoseconds, such that the cross-correlation between the signals propagated over said at least two propagation paths subject to said time variable delays is lower than the cross-correlation of said at least two signals to be propagated over said propagation paths.

13. The system of claim 12, comprising time variable delay elements arranged over all of said signal propagation paths for subjecting to time variable delays the signals propagating over all of said signal propagation paths.

14. The system of claim 12, comprising time variable delay elements arranged on two propagation paths associated with a same diversity antenna of said diversity antennas for subjecting to time variable delays two signals propagating over said two propagation paths associated with the same diversity antenna of said diversity antennas.

15. The system of claim 12, comprising:
    in the propagation paths for said at least two signals, respective distinct propagation portions and a combined propagation portion for said at least two signals;
    a respective time variable delay element arranged over the common portion of said propagation paths for subjecting said at least two signals to a time variable delay over said common portion of said propagation paths; and
    a fixed delay element arranged over the respective distinct portion of said propagation paths for subjecting one of said at least two signals to a fixed delay over said respective distinct portion of said propagation paths.

16. The system of claim 15, for diversity processing said at least two signals having a carrier frequency with a given period, wherein said fixed delay element has a delay equal to half said given period.

17. The system of claim 15, for diversity processing signals transmitted by means of said at least two diversity antennas comprising:
    splitter elements for splitting each of said at least two signals transmitted over respective transmission paths toward said diversity antennas; and
    combiner elements for combining at each of said diversity antennas the respective transmission paths of said at least two signals transmitted; and further comprising:

said fixed delay element arranged between said splitter elements and combiner elements; and said respective time variable delay element arranged either upstream of said splitter elements or downstream of said combiner elements.

18. The system of claim 12, for diversity processing signals transmitted by means of said at least two diversity antennas comprising:

splitter elements for splitting each of said at least two signals transmitted over respective transmission paths toward said diversity antennas; and combiner elements for combining at each of said diversity antennas the respective transmission paths of said at least two signals transmitted.

19. The system of claim 18, comprising said time variable delays arranged between said splitter elements and said combiner elements.

20. The system of claim 12, for diversity processing signals received by means of said at least two diversity antennas, comprising:

splitter elements for splitting each of said at least two signals received over respective reception paths from said diversity antennas; and combiner elements for combining the respective reception paths of said at least two signals received from different ones of said at least two diversity antennas.

21. The system of claim 12, for diversity processing signals transmitted and received by means of said at least two diversity antennas, comprising:

first reciprocal splitter/combiner elements for splitting each of said at least two signals transmitted over respective transmission paths toward said diversity antennas;

second reciprocal splitter/combiner elements for splitting each of said at least two signals received over respective reception paths from said diversity antennas and combining at each of said diversity antennas the respective transmission paths of said at least two signals being transmitted, said first reciprocal splitter/combining elements also combining the respective reception paths of said at least two signals received from different diversity antennas of said at least two diversity antennas.

22. The system of claim 12, comprising multiplier elements for multiplying by a complex signal, said at least two of said signals propagated via said at least two diversity antennas while said signals are in the form of baseband signals, whereby said time variable delays are applied to said at least two of said signals propagated via said at least two diversity antennas by subjecting said baseband signals to multiplication by a complex signal.

23. A wireless communication apparatus comprising the system of claim 12.

* * * * *